United States Patent
Miyairi et al.

(10) Patent No.: US 9,454,048 B2
(45) Date of Patent: Sep. 27, 2016

(54) LIQUID CRYSTAL DISPLAY DEVICE AND MANUFACTURING METHOD OF LIQUID CRYSTAL DISPLAY DEVICE

(75) Inventors: Hidekazu Miyairi, Kanagawa (JP); Tetsuji Ishitani, Kanagawa (JP); Daisuke Kubota, Kanagawa (JP); Shinya Sasagawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 225 days.

(21) Appl. No.: 13/416,077

(22) Filed: Mar. 9, 2012

(65) Prior Publication Data
US 2012/0229724 A1    Sep. 13, 2012

(30) Foreign Application Priority Data
Mar. 11, 2011    (JP) ................................. 2011-054001

(51) Int. Cl.
*G02F 1/1343*    (2006.01)
*C09K 19/02*    (2006.01)
*G02F 1/1362*    (2006.01)

(52) U.S. Cl.
CPC ..... *G02F 1/134363* (2013.01); *C09K 19/0275* (2013.01); *G02F 1/1362* (2013.01)

(58) Field of Classification Search
CPC .................................................. G02F 1/134363
USPC ........................................................... 349/139
See application file for complete search history.

(56) References Cited

U.S. PATENT DOCUMENTS

| | | | |
|---|---|---|---|
| 4,409,134 A | 10/1983 | Yamazaki | |
| 6,449,024 B1 | 9/2002 | Hirakata et al. | |
| 6,734,924 B2 | 5/2004 | Hirakata et al. | |
| 6,831,297 B2 | 12/2004 | Arao | |
| 7,038,754 B2 | 5/2006 | Hirakata et al. | |
| 7,136,128 B2 | 11/2006 | Hirakata et al. | |
| 7,439,087 B2 | 10/2008 | Ishikawa et al. | |
| 7,563,490 B2 | 7/2009 | Nishi et al. | |
| 7,626,663 B2 | 12/2009 | Kimura | |
| 7,728,942 B2 | 6/2010 | Hirakata et al. | |
| 7,872,722 B2 | 1/2011 | Kimura | |
| 8,199,300 B2 | 6/2012 | Hirakata et al. | |

(Continued)

FOREIGN PATENT DOCUMENTS

| | | |
|---|---|---|
| JP | 53-105982 A | 9/1978 |
| JP | 09-185076 A | 7/1997 |

(Continued)

*Primary Examiner* — Bumsuk Won
*Assistant Examiner* — Edmond Lau
(74) *Attorney, Agent, or Firm* — Nixon Peabody LLP; Jeffrey L. Costellia

(57) ABSTRACT

A horizontal electric field mode liquid crystal display device having a novel electrode structure, and a manufacturing method thereof are provided. The liquid crystal display device includes a first substrate having an insulating surface; a first conductive film and a second conductive film over the insulating surface; a first insulating film over the first conductive film; a second insulating film over the second conductive film; a second substrate facing the first substrate; and a liquid crystal layer positioned between the first substrate and the second substrate. Part of the first conductive film exists also on a side portion of the first insulating film, and part of the second conductive film exists also on a side portion of the second insulating film. The liquid crystal layer includes liquid crystal exhibiting a blue phase.

12 Claims, 13 Drawing Sheets

(56) References Cited

U.S. PATENT DOCUMENTS

| | | |
|---|---|---|
| 8,514,361 B2 | 8/2013 | Hirakata et al. |
| 2008/0008905 A1 | 1/2008 | Yamazaki |
| 2008/0070393 A1* | 3/2008 | Miyairi et al. ............... 438/585 |
| 2008/0093334 A1* | 4/2008 | Choi et al. .................... 216/13 |
| 2009/0219466 A1 | 9/2009 | Kagawa et al. |
| 2010/0105162 A1* | 4/2010 | Suzawa et al. ............... 438/104 |
| 2010/0195028 A1 | 8/2010 | Kubota et al. |
| 2010/0302492 A1 | 12/2010 | Kubota et al. |
| 2011/0024758 A1 | 2/2011 | Kimura |
| 2011/0032435 A1 | 2/2011 | Kimura |
| 2011/0037917 A1 | 2/2011 | Kimura |
| 2011/0122332 A1 | 5/2011 | Kubota et al. |
| 2011/0128491 A1 | 6/2011 | Kubota et al. |
| 2011/0249229 A1 | 10/2011 | Kubota et al. |

FOREIGN PATENT DOCUMENTS

| | | |
|---|---|---|
| JP | 09-211434 A | 8/1997 |
| JP | 2007-171938 | 7/2007 |
| JP | 2009-210695 | 9/2009 |

* cited by examiner

LIQUID CRYSTAL DISPLAY DEVICE AND MANUFACTURING METHOD OF LIQUID CRYSTAL DISPLAY DEVICE

BACKGROUND OF THE INVENTION

1. Field of the Invention

The present invention relates to a horizontal electric field mode liquid crystal display device and a manufacturing method thereof.

2. Description of the Related Art

A liquid crystal display device displays images in the following manner: a phenomenon in which the refractive index of liquid crystal is changed in response to alignment change of liquid crystal molecules caused by application of an electric field to the liquid crystal, that is, an electro-optical effect of liquid crystal is utilized. A horizontal electric field mode liquid crystal display device in which an electric field is applied to a liquid crystal layer by a pixel electrode and a common electrode formed in an element substrate is capable of displaying images with a wide viewing angle compared to a vertical electric field mode liquid crystal display device in which an electric field is applied to a liquid crystal layer by a pixel electrode formed in an element substrate and a common electrode formed on a counter substrate.

Among horizontal electric field modes, in particular, a blue phase mode employing liquid crystal exhibiting a blue phase provides a short response time of 1 msec or less and does not require an alignment film. Therefore, the display quality of a blue phase liquid crystal display device can be improved because high-speed driving is possible, and manufacturing cost thereof can be reduced because the number of components is reduced.

Patent Document 1 and Patent Document 2 below disclose electrode structures of blue phase liquid crystal display devices.

REFERENCE

Patent Documents

[Patent Document 1] Japanese Published Patent Application No. 2007-171938

[Patent Document 2] Japanese Published Patent Application No. 2009-210695

SUMMARY OF THE INVENTION

In liquid crystal display devices employing a horizontal electric field mode such as a blue phase mode, an electrode structure differs from manufacturer to manufacturer, and each electrode structure is unique and technically elaborate. However, it still cannot be said that the consideration of the electrode structure is enough, and it has been desired that a novel electrode structure utilizing characteristics of liquid crystal exhibiting a blue phase be proposed.

In a transistor whose active layer includes silicon or germanium, shielding the active layer from light by a gate electrode is effective in suppressing generation of photocurrent. However, in this case, the parasitic capacitance between the gate electrode and source and drain electrodes becomes large; thus, the switching speed of the transistor is decreased. In the case where the number of pixels in a liquid crystal display device is small, the above-described reduction in switching speed does not lead to a significant problem, while in the case where the size and the definition of a liquid crystal display device are increased and the number of pixels is increased to 2 k×4 k, the above-described parasitic capacitance contributes to the prevention of an increase in driving speed of a pixel portion.

In view of the above problems, an object of the present invention is to provide a horizontal electric field mode liquid crystal display device having a novel electrode structure, and a manufacturing method thereof.

In view of the above problems, another object of the present invention is to provide a liquid crystal display device in which a reduction in driving speed of a pixel portion can be prevented even when the number of pixels is increased, and a manufacturing method thereof.

In the case of a liquid crystal display device employing a horizontal electric field mode such as a blue phase mode, a strong electric field needs to be applied to a liquid crystal layer as compared to the case of a general vertical electric field mode such as a TN mode. Further, it is important to determine arrangement and shapes of a pixel electrode and a common electrode in order to increase the intensity of an electric field in the longitudinal direction of a substrate, i.e., the horizontal direction. Therefore, in the case of a horizontal electric field mode such as a blue phase mode, the thicknesses of a pixel electrode and a common electrode are made larger than those in the case of a vertical electric field mode, and the gradient of side portions of the pixel electrode and the common electrode is made steep; thus, the display area in a liquid crystal layer can be large, so that the contrast can be improved.

In a liquid crystal display device according to one embodiment of the present invention, dry etching is used when one conductive film is processed into desired shapes to form a pair of conductive films serving as a pixel electrode and a common electrode. In processing by the dry etching, a conductive material for forming the one conductive film or a reaction product of the conductive material and a gas used for the dry etching is deposited on a side portion of an insulating film formed over the one conductive film. Therefore, the insulating film is formed over the pixel electrode and the common electrode which are formed by the dry etching, and part of the conductive film serving as the pixel electrode and the common electrode exists also on the side portion of the insulating film. The part of the conductive film existing on the side portion of the insulating film is called "rabbit ear" or "fence". In one embodiment of the present invention, the rabbit ear formed through the dry etching is also used as the pixel electrode and the common electrode.

Specifically, a liquid crystal display device according to one embodiment of the present invention includes a first substrate; a first conductive film and a second conductive film formed over the first substrate; a first insulating film over the first conductive film; and a second insulating film over the second conductive film. Part of the first conductive film exists also on a side portion of the first insulating film, and part of the second conductive film exits also on a side portion of the second insulating film. One of the first conductive film and the second conductive film functions as a pixel electrode, and the other of the first conductive film and the second conductive film functions as a common electrode. Further, in the liquid crystal display device according to one embodiment of the present invention, a second substrate is provided so as to face the first substrate with the first conductive film, the first insulating film, the second conductive film, and the second insulating film interposed therebetween. Furthermore, a liquid crystal layer is provided between the first substrate and the second substrate, and the liquid crystal layer includes liquid crystal exhibiting a blue phase.

A liquid crystal display device according to one embodiment of the present invention may include, in addition to the above structure, a transistor. The transistor may include a gate electrode; a gate insulating film over the gate electrode; an active layer which overlaps with the gate electrode, over the gate insulating film; and a third conductive film and a fourth conductive film over the active layer. In the active layer, a layer including microcrystalline silicon is provided. One of the third conductive film and the fourth conductive film functions as a source electrode and the other of the third conductive film and the fourth conductive film functions as a drain electrode. The third conductive film and the fourth conductive film are separate from a side portion of the active layer. An insulating film in which openings are formed is provided over the active layer so as to cover the third conductive film and the fourth conductive film. A fifth conductive film connected to the third conductive film through the opening and a sixth conductive film connected to the fourth conductive film through the opening are provided over the insulating film. Like the fifth conductive film and the sixth conductive film, the first conductive film and the second conductive film are positioned over the insulating film.

According to one embodiment of the present invention, with the above structure, the thicknesses of a pixel electrode and a common electrode can be larger than those in a vertical electric field mode, and the gradient of a side portion of each of the pixel electrode and the common electrode can be made steep. Further, in the liquid crystal display device having a novel electrode structure, the display area in a liquid crystal layer can be surely enlarged; thus, an improvement in contrast can be achieved.

Further, according to one embodiment of the present invention, with the above structure, the parasitic capacitance in a transistor can be reduced, so that a reduction in driving speed of a pixel portion can be prevented even when the number of pixels is increased.

DETAILED DESCRIPTION OF THE INVENTION

Hereinafter, embodiments and an example of the present invention will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be construed as being limited to the description in the following embodiments and example.

Note that a liquid crystal display device according to one embodiment of the present invention includes a panel in which a display element is sealed, and a module in which an IC including a driver circuit or a controller, or the like is mounted on the panel.

Further, a liquid crystal display device according to one embodiment of the present invention includes, in its category, an element substrate corresponding to one mode before a liquid crystal element is completed in a manufacturing process of the liquid crystal display device. In the element substrate, each of a plurality of pixels is provided with a transistor, and a pixel electrode and a common electrode to which voltage is supplied through the transistor.

Embodiment 1

Figure 1A:
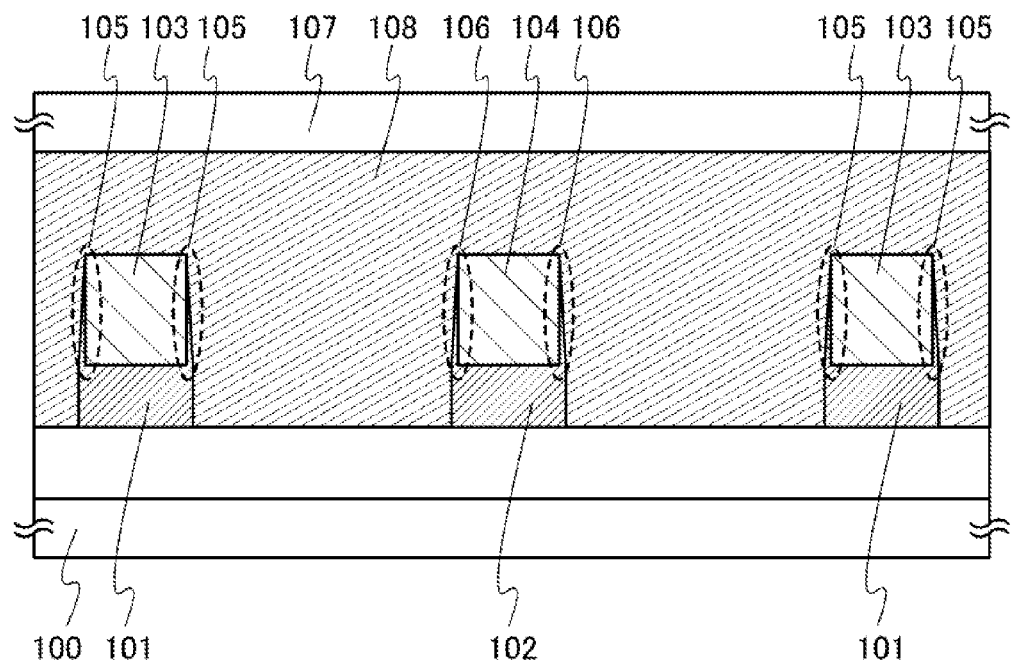
FIGS. 1A and 1B illustrate a cross-sectional structure of a pixel electrode and a common electrode and a cross-sectional structure of a pixel, respectively.

FIG. 1A illustrates one example of a cross-sectional structure of a pixel electrode and a common electrode in one embodiment of the present invention. In FIG. 1A, a pixel electrode 101 and a common electrode 102 are formed over a substrate 100. Note that a semiconductor element such as a transistor, an insulating film, and a conductive film such as a wiring may be formed between the substrate 100, and the pixel electrode 101 and the common electrode 102.

An insulating film 103 is formed over the pixel electrode 101, and an insulating film 104 is formed over the common electrode 102. Part of the pixel electrode 101, which is surrounded by a dashed line 105, is positioned on a side portion of the insulating film 103. Similarly, part of the common electrode 102, which is surrounded by a dashed line 106, is positioned on a side portion of the insulating film 104.

A substrate 107 is provided so as to face the substrate 100 with the pixel electrode 101, the common electrode 102, the insulating film 103, and the insulating film 104 interposed therebetween. A liquid crystal layer 108 is provided between the substrate 100 and the substrate 107. The liquid crystal layer 108 exists also between the pixel electrode 101 and the common electrode 102.

The liquid crystal layer 108 includes liquid crystal exhibiting a blue phase. A blue phase is one of liquid crystal phases, which is generated just before a cholesteric phase changes into an isotropic phase while temperature of cholesteric liquid crystal is increased. Since the blue phase is only generated within a narrow range of temperature, a chiral agent or an ultraviolet curable resin is added so that the temperature range is improved. The liquid crystal layer which includes liquid crystal exhibiting a blue phase and a chiral agent is preferable because it has a short response time of 1 msec or less, has optical isotropy, which makes the alignment process unneeded, and has a small viewing angle dependence.

Because of the part of the pixel electrode 101 surrounded by the dashed line 105 and the part of the common electrode 102 surrounded by the dashed line 106, the width of each of the pixel electrode 101 and the common electrode 102 in FIG. 1A can be surely large in a direction perpendicular to the longitudinal direction of the substrate 100. With such a structure, the area of a region to which an electric field is applied from the pixel electrode 101 and the common electrode 102 in the longitudinal direction of the substrate 100, i.e., the horizontal direction can be enlarged in the perpendicular direction.

As for the pixel electrode 101 and the common electrode 102 in FIG. 1A, the gradient of side portions of the pixel electrode 101 and the common electrode 102 can be made steep because of the part of the pixel electrode 101 surrounded by the dashed line 105 and the part of the common electrode 102 surrounded by the dashed line 106. With such a structure, between the pixel electrode 101 and the common electrode 102, the intensity of an electric field in the horizontal direction can be uniform.

In the case of a blue phase mode, the display region in the liquid crystal layer 108 is a region to which an electric field can be applied in the horizontal direction with intensity in a range where optical isotropy and anisotropy of liquid crystal exhibiting a blue phase can be switched. In one embodiment of the present invention, the thicknesses of the pixel electrode 101 and the common electrode 102 are made larger than those in the vertical electric field mode, and the gradient of the side portions of the pixel electrode 101 and the common electrode 102 is made steep; thus, the display area in the liquid crystal layer 108 can be surely enlarged, and the contrast can be improved.

In the example of FIG. 1A, the insulating films 103 and 104 are separate from the substrate 107, and the liquid crystal layer 108 is provided between the insulating films 103 and 104 and the substrate 107. However, in one embodiment of the present invention, the insulating films 103 and 104 and the substrate 107 may be in direct contact with each other, or may be in contact with each other with an insulating film interposed therebetween. In the case of such a structure, the distance between the substrate 100 and the substrate 107 can be controlled with the insulating films 103 and 104.

Figure 1B:
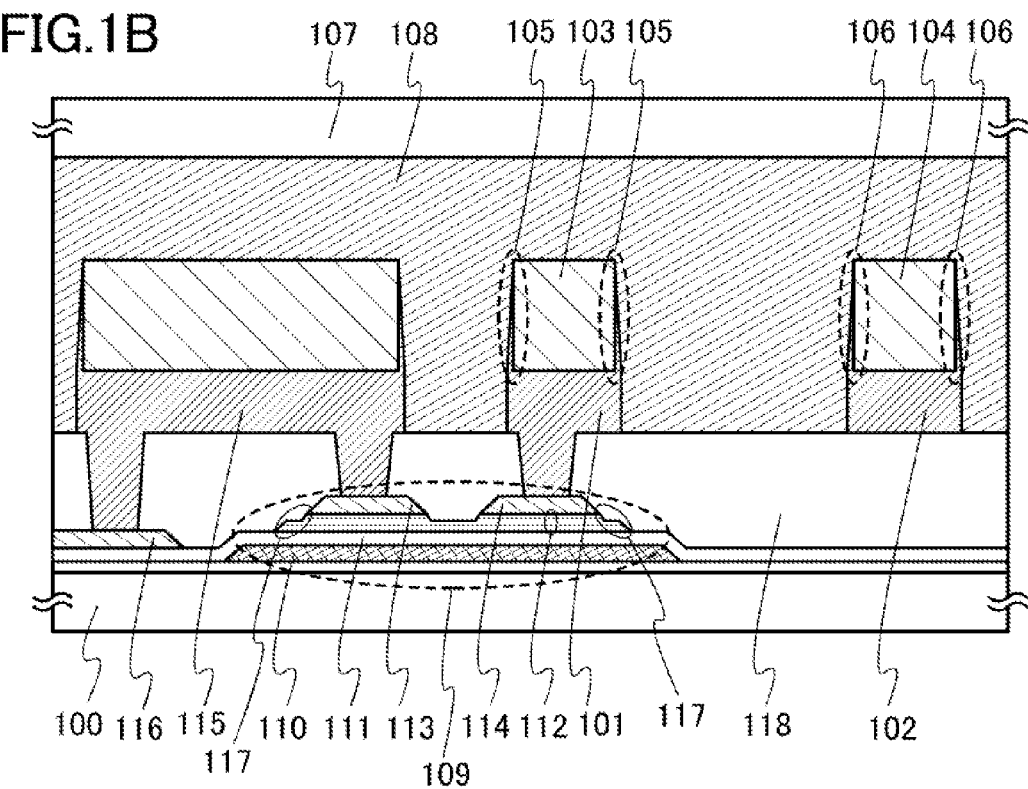

FIG. 1B illustrates an example of a cross-sectional structure of a pixel included in a liquid crystal display device according to one embodiment of the present invention. In FIG. 1B, a transistor 109, the pixel electrode 101, and the common electrode 102 are formed over the substrate 100.

As in FIG. 1A, the insulating film 103 is formed over the pixel electrode 101, and the insulating film 104 is formed over the common electrode 102 in FIG. 1B. Part of the pixel electrode 101, which is surrounded by the dashed line 105, is positioned on a side portion of the insulating film 103. Similarly, part of the common electrode 102, which is surrounded by the dashed line 106, is positioned on a side portion of the insulating film 104.

The substrate 107 is provided so as to face the substrate 100 with the pixel electrode 101, the common electrode 102, the insulating film 103, and the insulating film 104 interposed therebetween. The liquid crystal layer 108 is provided between the substrate 100 and the substrate 107. The liquid crystal layer 108 exists also between the pixel electrode 101 and the common electrode 102.

The transistor 109 includes a gate electrode 110; a gate insulating film 111 over the gate electrode 110; an active layer 112 overlapping with the gate electrode 110, over the gate insulating film 111; and a source electrode 113 and a drain electrode 114 over the active layer 112. In the transistor 109, since the entire active layer 112 overlaps with the gate electrode 110, light from the substrate 100 side can be prevented from entering the active layer 112.

The transistor 109 is covered with an insulating film 118, and the pixel electrode 101, the common electrode 102, and the wiring 115 are formed over the insulating film 118. The source electrode 113 is connected to the wiring 115 through an opening formed in the insulating film 118. The wiring 115 is connected to a signal line 116 to which an image signal is supplied, through an opening formed in the insulating film 118. The drain electrode 114 is connected to the pixel electrode 101 through an opening formed in the insulating film 118.

In the example of FIG. 1B, the wiring 115 is in direct contact with the signal line 116; however, the wiring 115 may be connected to the signal line 116 through another conductive film. Further, in the example of FIG. 1B, the drain electrode 114 is in direct contact with the pixel electrode 101; however, the drain electrode 114 may be connected to the pixel electrode 101 through another conductive film.

The wiring 115 can be formed at the same time as the pixel electrode 101 and the common electrode 102 by processing one conductive film into desired shapes. The signal line 116 can be formed at the same time as the source electrode 113 and the drain electrode 114 by processing one conductive film into desired shapes.

In the transistor 109 illustrated in FIG. 1B, the source electrode 113 and the drain electrode 114 are separate from a side portion of the active layer 112, which is surrounded by a solid line 117, and the gate insulating film 111 and the active layer 112 are provided between the gate electrode 110, and the source electrode 113 and the drain electrode 114. That is, although the entire active layer 112 overlaps with the gate electrode 110, there is no region where the gate insulating film 111 is in contact with the gate electrode 110 and each of the source electrode 113 and the drain electrode 114. In one embodiment of the present invention, with such a structure, the parasitic capacitance formed between the gate electrode 110, and the source electrode 113 and the drain electrode 114 can be reduced, and the switching speed of the transistor 109 can be improved.

Since the switching speed of the transistor 109 is improved, the driving speed in a pixel portion can be improved. In particular, when the size and the definition of a liquid crystal display device are increased and the number of pixels is increased to 2 k×4 k, the parasitic capacitance in the entire pixel portion becomes significantly large; thus, with the above structure, the driving speed can be drastically improved.

In one embodiment of the present invention, the active layer 112 can be formed using an amorphous semiconductor, a microcrystalline semiconductor, a polycrystalline semiconductor, or a signal crystal semiconductor of silicon, germanium, or the like.

A film of a microcrystalline semiconductor can be formed on a large-sized substrate, which is different from a film of a polycrystalline semiconductor and a film of a single crystal semiconductor. Therefore, it can be said that a transistor including a microcrystalline semiconductor is suitable for a large-sized liquid crystal display device compared to a transistor including a polycrystalline semiconductor or a single crystal semiconductor. A transistor including a microcrystalline semiconductor has higher mobility and a larger amount of on-state current than a transistor including an amorphous semiconductor. Therefore, it can also be said that a transistor including a microcrystalline semiconductor is suitable for a liquid crystal display device in which liquid crystal exhibiting a blue phase is used so that the response speed is high.

However, the amount of off-state current of a transistor in which an active layer includes microcrystalline silicon is larger than that of a transistor in which an active layer includes amorphous silicon. The reason why the amount of off-state current is large is that, in a side portion of the active layer, Schottky junction is formed between a layer containing microcrystalline silicon and a conductive film such as a source electrode or a drain electrode; accordingly, holes are injected from the conductive film to the layer containing microcrystalline silicon. When the amount of off-state current of the transistor is large, electric charge cannot be held between a pixel electrode and a common electrode to easily generate flickers.

However, in the transistor 109 illustrated in FIG. 1B, the source electrode 113 and the drain electrode 114 are separate from the side portion of the active layer 112, which is surrounded by the solid line 117. That is, in one embodiment of the present invention, the source electrode 113 and the drain electrode 114 are not in contact with the side portion of a microcrystalline semiconductor layer in the active layer 112. Therefore, current can be prevented from flowing between the microcrystalline semiconductor layer, and the source electrode 113 and the drain electrode 114, and off-state current can be reduced as compared to the case where the source electrode 113 and the drain electrode 114 are in contact with the microcrystalline semiconductor layer.

Unless otherwise specified, in the case of an n-channel transistor, off-state current in this specification is a current which flows between a source electrode and a drain electrode when, in the state where the potential of the drain electrode is higher than that of the source electrode and that of a gate electrode, the potential of the gate electrode is less than or equal to zero with respect to the potential of the source electrode. Furthermore, in this specification, in the case of a p-channel transistor, off-state current is a current which flows between a source electrode and a drain electrode when, in the state where the potential of the drain electrode is lower than that of the source electrode or that of a gate electrode, the potential of the gate electrode is greater than or equal to zero with respect to the potential of the source electrode.

The transistor 109 has a function of holding electric charge which is accumulated between the pixel electrode 101 and the common electrode 102. Therefore, when the amount of off-state current of the transistor 109 is large, the amount of electric charge leaking through the transistor 109 is large so that flickers are easily generated. However, in one embodiment of the present invention, the off-state current of the transistor 109 can be reduced; thus, leakage of electric charge can be prevented so that generation of flickers can be suppressed, whereby the display quality can be improved.

Photocurrent is easily generated in a transistor whose active layer includes a microcrystalline semiconductor as compared to the case of a transistor whose active layer includes an amorphous semiconductor. However, as described above, in one embodiment of the present invention, the entire active layer 112 overlaps with the gate electrode 110 so that light from the substrate 100 side can be prevented from entering the active layer 112; thus, generation of photocurrent can be suppressed.

Note that in the case where a source electrode and a drain electrode are in contact with a side portion of an active layer in a transistor whose active layer includes a microcrystalline semiconductor, the amount of off-state current tends to be increased due to injection of holes described above when a structure where the active layer is shielded from light by a gate electrode is employed. However, as described above, in one embodiment of the present invention, the source electrode 113 and the drain electrode 114 are separate from the side portion of the active layer 112. Therefore, even when the structure where the active layer 112 is shielded from light by the gate electrode 110 is employed, current can be prevented from flowing between the microcrystalline layer in the active layer 112, and the source electrode 113 and the drain electrode 114; accordingly, the off-state current can be reduced.

Next, an example of a manufacturing method of the pixel electrode and the common electrode will be described.

Figure 2A:
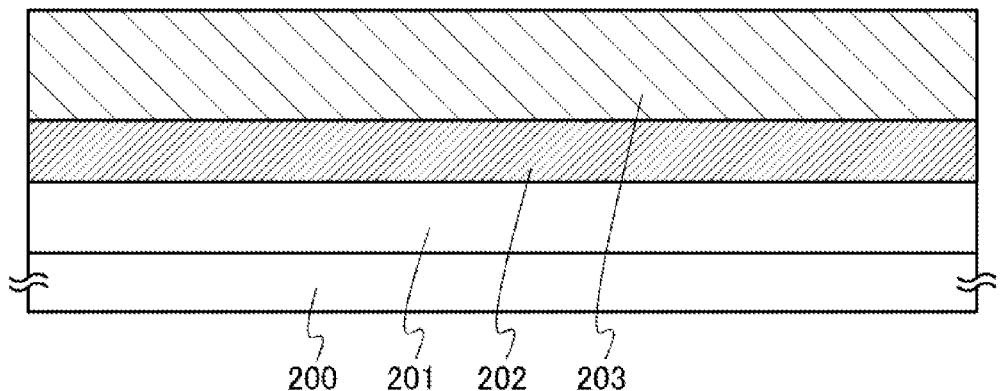
FIGS. 2A to 2C illustrate a manufacturing method of a pixel electrode and a common electrode.

First, as illustrated in FIG. 2A, over a substrate 200 provided with an insulating film 201, a conductive film 202 and an insulating film 203 are sequentially formed. In order to form a rabbit ear through dry etching of the conductive film 202 performed later, the thickness of the conductive film 202 is preferably at least 50 nm or more, more preferably 100 nm or more.

Figure 2B:
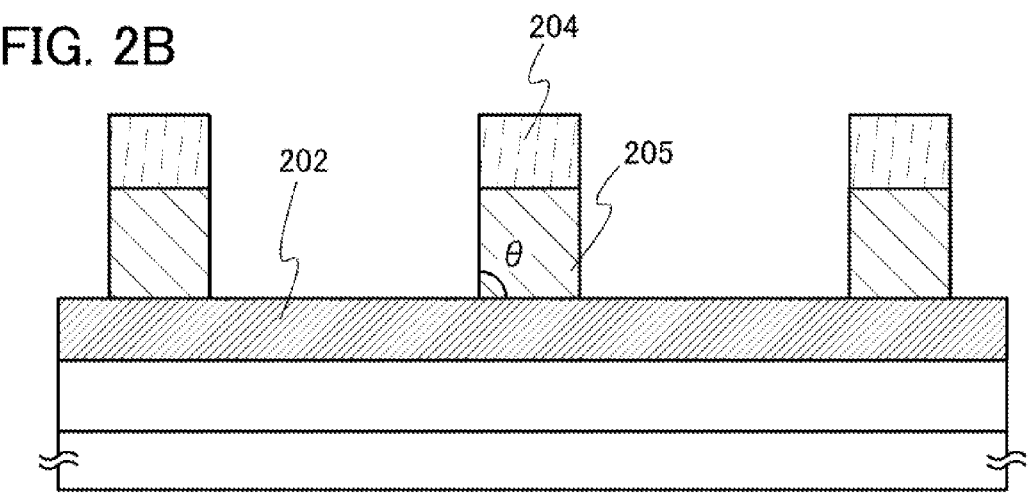

Next, as illustrated in FIG. 2B, a mask 204 having a desired shape is formed over the insulating film 203, and the insulating film 203 is etched, whereby an insulating film 205 is formed. The gradient of a side portion of the insulating film 205 is preferably steep because, in that case, a rabbit ear is easily formed through dry etching, of the conductive film 202 and the gradient of a side portion of a conductive film 206 which is to be obtained after the dry etching can be made steep. Specifically, the tapered angle θ formed between a surface of the side portion of the insulating film 205 and a surface of the conductive film 202 serving as a base is greater than or equal to 50° and less than or equal to 90°, preferably greater than or equal to 60° and less than or equal to 90°.

It is preferable that the insulating film 203 be processed not by wet etching but by dry etching in order to make the gradient of the side portion of the insulating film 205 steep.

Figure 2C:
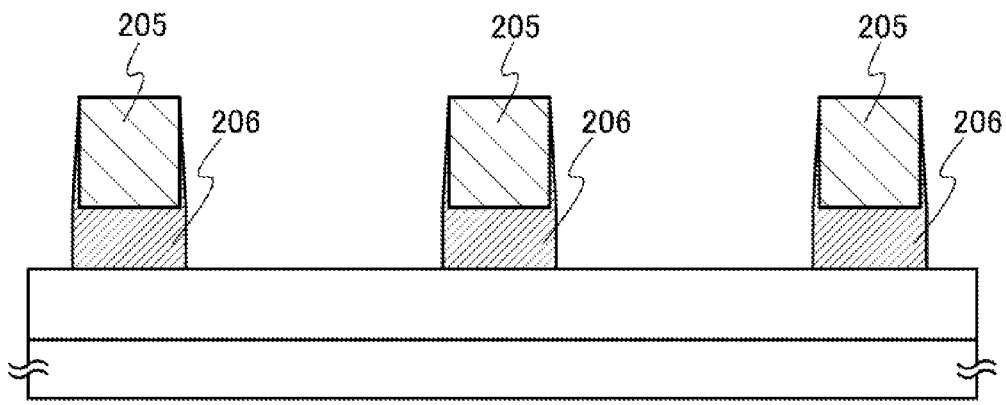

After the mask 204 is removed, the conductive film 202 is processed by dry etching with the use of the insulating film 205 as a mask, so that the conductive film 206 is formed as illustrated in FIG. 2C. In the dry etching, a conductive material for forming the conductive film 202, or a reaction product of the conductive material and a gas used for the dry etching is deposited on the side portion of the insulating film 205; in this manner, a rabbit ear is formed.

Note that formation of the rabbit ear depends on the conductive material for forming the conductive film 202, conditions for the dry etching, or the like. For example, in the case where the conductive film 202 is formed using tungsten, tantalum nitride, or the like, the substrate temperature is preferably higher than or equal to −20° C. and lower than or equal to 0° C. so that the rabbit ear is easily formed.

Through the above steps, the conductive film 206 to be the pixel electrode or the common electrode can be formed.

In the case where a conductive film with a large thickness is subjected to dry etching to form a pixel electrode and a common electrode each having a large width in a direction perpendicular to a substrate, for example, the following problems arise when the thickness of the conductive film before the dry etching is increased to about several micrometers: the gradient of a side portion of the conductive film after the dry etching is smooth because the dry etching of the conductive film proceeds in the horizontal direction (i.e., side etching); the line width of the conductive film after the dry etching is small due to the side etching; and the thickness of the conductive film after the dry etching is small because a mask is lost during the dry etching. Therefore, in the case where dry etching is employed, it is difficult to form a pixel electrode or a common electrode having both a large thickness and a steep gradient of a side portion.

However, in one embodiment of the present invention, since the rabbit ear is formed, the pixel electrode and the common electrode each having a large width in a direction perpendicular to the substrate 100 can be easily formed without increasing the number of masks.

Embodiment 2

In this embodiment, a structure of a pixel of a liquid crystal display device according to one embodiment of the present invention will be described.

Figure 3:
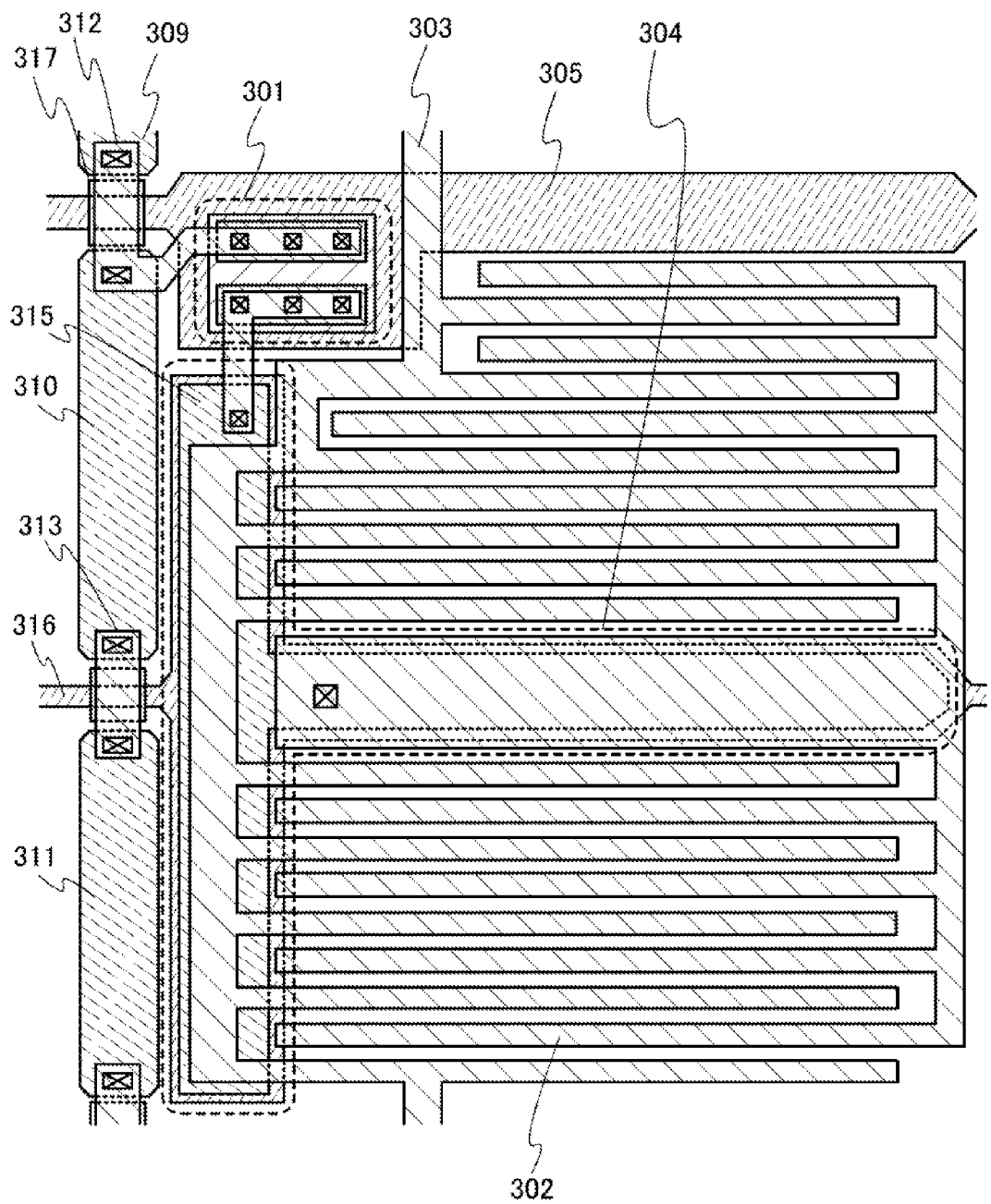
FIG. 3 is a top view of a pixel.
Figure 4:
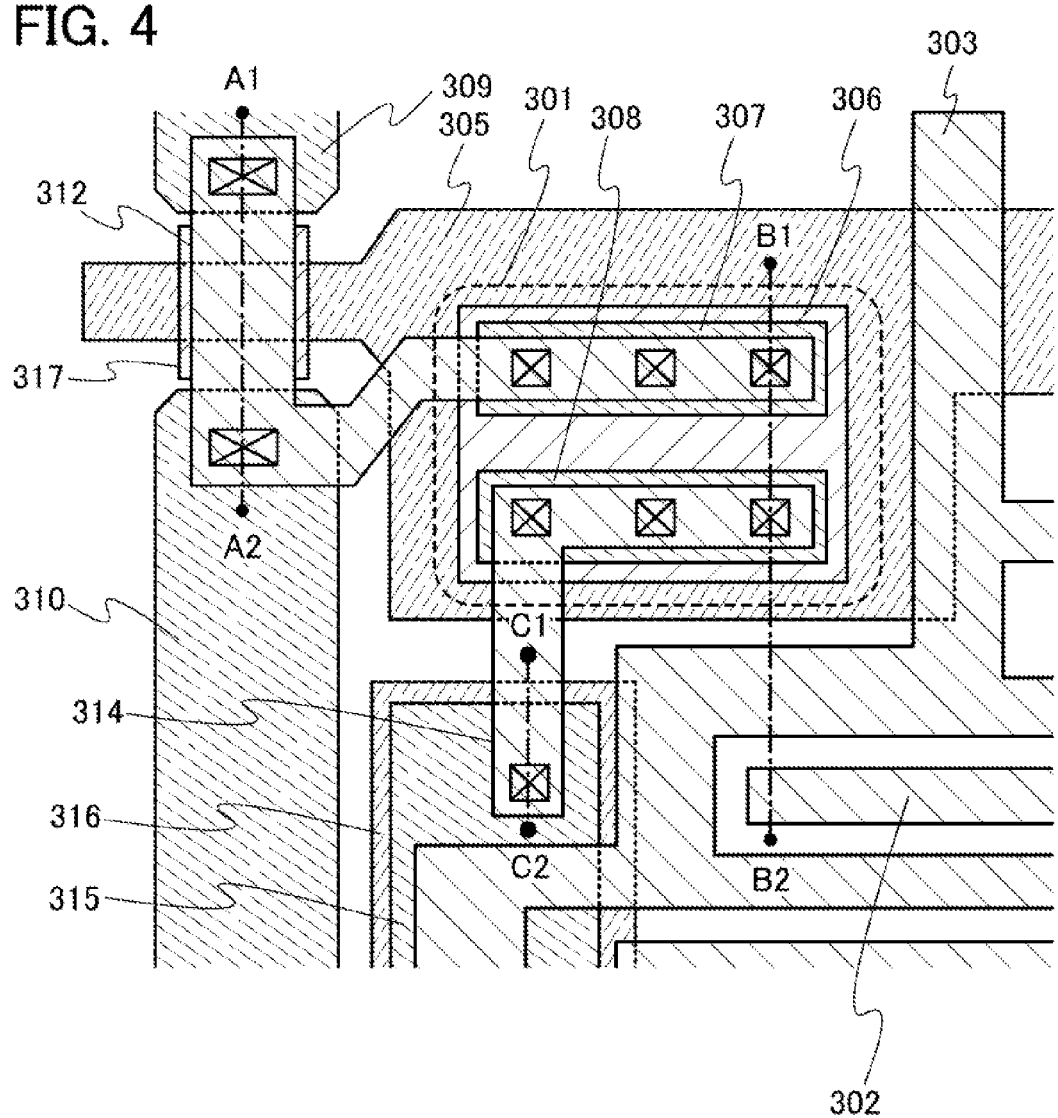
FIG. 4 is an enlarged view of part of a pixel.
Figure 5:
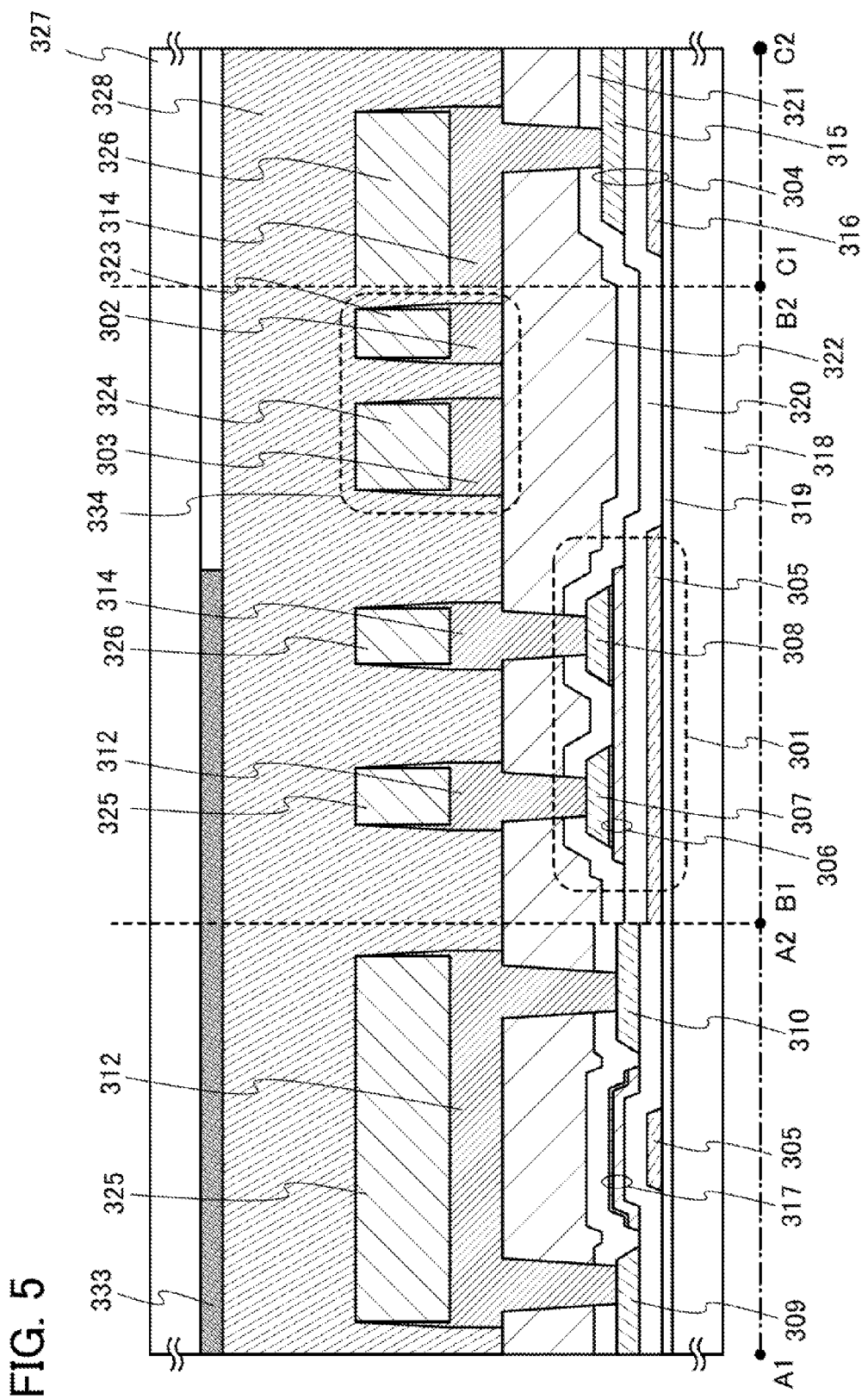
FIG. 5 is a cross-sectional view of a pixel.

FIG. 3 is an example of a top view of a pixel. FIG. 4 is an enlarged top view of part of the pixel in FIG. 3. FIG. 5 illustrates a cross-sectional view taken along dashed line A1-A2 in FIG. 4, a cross-sectional view taken along dashed line B1-B2 in FIG. 4, and a cross-sectional view taken along dashed line C1-C2 in FIG. 4.

The pixel in FIG. 3 includes a transistor 301, a pixel electrode 302, a common electrode 303, and a capacitor 304.

The transistor 301 includes a conductive film 305 functioning as a gate electrode, an active layer 306 formed so as to overlap with the conductive film 305 with an insulating film 320 interposed therebetween, and a conductive film 307 and a conductive film 308 functioning as a source electrode and a drain electrode over the active layer 306.

The conductive film 305 functions not only as a gate electrode of the transistor 301 but also as a scan line. A conductive film 309, a conductive film 310, and a conductive film 311 function as signal lines. A conductive film 312 is connected to the conductive film 309 and the conductive film 310, and a conductive film 313 is connected to the conductive film 310 and the conductive film 311. Each of the conductive films 312 and 313 functions as a signal line.

The conductive film 307 is connected to the conductive film 312 through an opening formed in insulating films 321 and 322 over the conductive film 307. The conductive film 308 is connected to a conductive film 314 through an opening formed in the insulating films 321 and 322 over the conductive film 308. The conductive film 314 is connected to a conductive film 315 through an opening formed in the insulating films 321 and 322. The conductive film 315 is connected to the pixel electrode 302 through an opening formed in the insulating films 321 and 322.

A conductive film 316 overlaps with the conductive film 315 with the gate insulating film 320 interposed therebetween. A portion where the conductive film 3-16, the gate insulating film 320, and the conductive film 315 overlap with each other functions as the capacitor 304.

The conductive film 305 and the conductive film 316 can be formed in such a manner that a conductive film is formed over an insulating film 319 formed over a substrate 318, and then the conductive film is processed into desired shapes by etching or the like. A semiconductor layer 317 and the active layer 306 can be formed in such a manner that a semiconductor film is formed over the gate insulating film 320, and then the semiconductor film is processed into desired shapes by etching or the like. The conductive films 309, 310, 311, 307, 308, and 315 can be formed in such a manner that a conductive film is formed over the gate insulating film 320 and/or the active layer 306, and then the conductive film is processed into desired shapes by etching or the like. The pixel electrode 302, the common electrode 303, the conductive film 312, and the conductive film 314 can be formed in such a manner that a conductive film is formed over the insulating film 322, and then the conductive film is processed into desired shaped by etching or the like.

In this embodiment, the conductive film 309 and the conductive film 310 are connected to each other through the conductive film 312 over the insulating films 321 and 322, and the conductive films 312, 309, and 310 function as signal lines. The conductive film 305 functioning as a scan line and the conductive film 312 are provided so as to overlap with each other, whereby the parasitic capacitance generated in a crossing portion of the signal line and the scan line can be reduced. Further, in this embodiment, since the semiconductor layer 317 is provided between the conductive film 305 functioning as a scan line and the conductive film 312 functioning as a signal line, the above parasitic capacitance can be further reduced.

Figure 6:
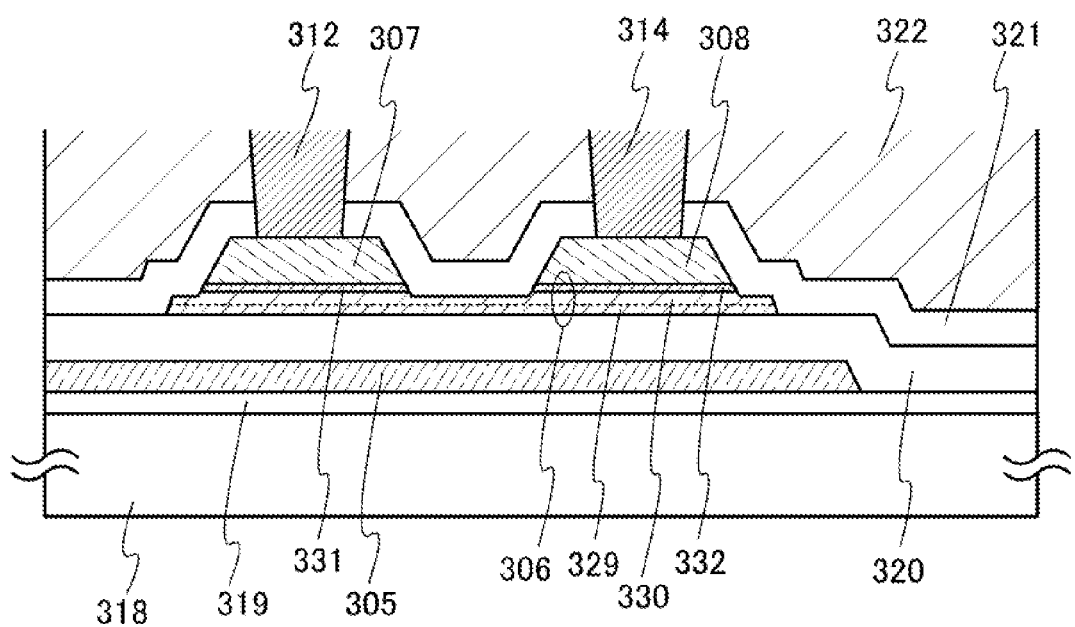
FIG. 6 is a cross-sectional view of a transistor.

FIG. 6 illustrates an enlarged cross section of the transistor 301 in FIG. 5. As illustrated in FIG. 6, the active layer 306 in the transistor 301 includes a microcrystalline semiconductor layer 329, an amorphous semiconductor layer 330 over the microcrystalline semiconductor layer 329, and impurity semiconductor layers 331 and 332 functioning as a source region and a drain region over the amorphous semiconductor layer 330. The impurity semiconductor layer 331 is positioned between the amorphous semiconductor layer 330 and the conductive film 307, and the impurity semiconductor layer 332 is positioned between the amorphous semiconductor layer 330 and the conductive film 308.

In the example of FIG. 6, one amorphous semiconductor layer 330 is provided between the microcrystalline semiconductor layer 329 and the impurity semiconductor layers 331 and 332. However, in one embodiment of the present invention, an active layer may have the following structure: a pair of amorphous semiconductor layers is provided over a microcrystalline semiconductor layer, one impurity semiconductor layer is provided over one of the amorphous semiconductor layers, and another impurity semiconductor layer is provide over the other of the amorphous semiconductor layers.

The transistor 301 may include another gate electrode (back gate electrode) over the insulating film 321 which covers the active layer 306, the conductive film 307, and the conductive film 308. When the transistor 301 includes a back gate electrode, the gate electrode is supplied with a signal for controlling switching, and the back gate electrode may be in a floating state (i.e., electrically isolated) or may be supplied with a potential from another wiring. In the latter case, the gate electrode and the back gate electrode may be supplied with potentials at the same level, or only the back gate electrode may be supplied with a fixed potential such as a ground potential. By controlling the level of the potential supplied to the back gate electrode, the threshold voltage of the transistor 301 can be controlled.

The microcrystalline semiconductor layer 329 includes a microcrystalline semiconductor. The microcrystalline semiconductor is a semiconductor having an intermediate structure between an amorphous structure and a crystalline structure (including a single crystal structure and a polycrystalline structure). A microcrystalline semiconductor is a semiconductor having a third state that is stable in terms of free energy and is a crystalline semiconductor having short-range order and lattice distortion, in which columnar or needle-like crystals having a grain size of 2 nm to 200 nm, preferably 10 nm to 80 nm, more preferably 20 nm to 50 nm have grown in a direction normal to the substrate surface. Therefore, a crystal grain boundary is formed at the interface of the columnar or needle-like crystal grains in some cases.

The Raman spectrum of microcrystalline silicon, which is a typical example of a microcrystalline semiconductor, is located in lower wave numbers than 520 $cm^{-1}$, which represents a peak of the Raman spectrum of single crystal silicon. That is, the peak of the Raman spectrum of the microcrystalline silicon exists between 520 $cm^{-1}$ which represents single crystal silicon and 480 $cm^{-1}$ which represents amorphous silicon. In addition, microcrystalline silicon includes hydrogen or halogen at 1 atomic % or more in order to terminate a dangling bond. Moreover, microcrystalline silicon is made to contain a rare gas element such as helium, argon, krypton, or neon to further enhance lattice distortion, whereby stability is improved and a favorable microcrystalline semiconductor film can be obtained. Such a microcrystalline semiconductor is disclosed in, for example, U.S. Pat. No. 4,409,134.

By setting the thickness of the microcrystalline semiconductor layer 329, that is, the distance from the interface between the microcrystalline semiconductor layer 329 and the gate insulating film 320 to the tip of the projection of the microcrystalline semiconductor layer 329 to 3 nm to 410 nm, preferably 20 nm to 100 nm, the off-state current of the transistor can be reduced.

Further, it is preferable that the oxygen concentration and the nitrogen concentration in the microcrystalline semiconductor layer 329 which are measured by secondary ion mass spectrometry be less than $1 \times 10^{18}$ atoms/cm$^3$, because the crystallinity of the microcrystalline semiconductor layer 329 can be improved.

The amorphous semiconductor layer 330 includes an amorphous semiconductor containing nitrogen. Nitrogen in the amorphous semiconductor layer 330 may exist, for example, as an NH group or an NH$_2$ group. Amorphous silicon can be used as an amorphous semiconductor.

The amorphous semiconductor containing nitrogen is a semiconductor having lower energy at an Urbach edge measured by a constant photocurrent method (CPM) or photoluminescence spectroscopy and a smaller amount of absorption spectra of defective levels as compared to a conventional amorphous semiconductor. In other words, as compared to the conventional amorphous semiconductor, the amorphous semiconductor containing nitrogen is a well-ordered semiconductor having fewer defects and a steep tail of a level at a band edge in the valence band.

In the case where the transistor 301 is an n-channel transistor, the impurity semiconductor layers 331 and 332 are formed of amorphous silicon to which phosphorus is added, microcrystalline silicon to which phosphorus is added, or the like. Alternatively, the impurity semiconductor layers 331 and 332 can have a stacked structure of amorphous silicon to which phosphorus is added and microcrystalline silicon to which phosphorus is added. In the case where the transistor 301 is a p-channel transistor, the impurity semiconductor layers 331 and 332 are formed of amorphous silicon to which boron is added, microcrystalline silicon to which boron is added, or the like. Note that in the case where the active layer 306 and the conductive films 307 and 308 form an ohmic contact, the active layer 306 does not necessarily include the impurity semiconductor layers 331 and 332.

In one embodiment of the present invention, as illustrated in FIG. 3, FIG. 4, FIG. 5, and FIG. 6, the conductive films 307 and 308 functioning as a source electrode and a drain electrode are separate from a side portion of the active layer 306. That is, in one embodiment of the present invention, the conductive films 307 and 308 are not in contact with a side portion of the microcrystalline semiconductor layer 329 in the active layer 306. Through the conductive film 312 over the insulating films 321 and 322, the conductive film 307 functioning as a source electrode or a drain electrode is supplied with a potential of an image signal. Therefore, the off-state current of the transistor 301 can be reduced, whereby leakage of electric charge can be prevented and the display quality can be improved. Through the conductive film 314 over the insulating films 321 and 322 and the conductive film 315 which is separate from the active layer 306, the pixel electrode 302 is supplied with a potential from the conductive film 308 functioning as a source electrode or a drain electrode. With the above structure, the parasitic capacitance generated between the conductive films 307 and 308 and the conductive film 305 functioning as a gate electrode can be reduced, whereby the switching speed of the transistor 301 can be improved.

Insulating films 323, 324, 325, and 326 are formed over the pixel electrode 302, the common electrode 303, the conductive film 312, and the conductive film 314, respectively. In one embodiment of the present invention, part of the pixel electrode 302 is formed on a side portion of the insulating film 323, and part of the common electrode 303 is formed on a side portion of the insulating film 324. In FIG. 5, part of the conductive film 312 is formed on a side portion of the insulating film 325, and part of the conductive film 314 is formed on a side portion of the insulating film 326.

A substrate 327 is provided so as to face the substrate 318. A liquid crystal layer 328 is provided between the substrate 318 and the substrate 327. The liquid crystal layer 328 exists also between the pixel electrode 302 and the common electrode 303. A region including the pixel electrode 302, the common electrode 303, and the liquid crystal layer 328 functions as a liquid crystal element 334.

In FIG. 5, a blocking film 333 is provided on the substrate 327. The blocking film 333 has a function of preventing disclination caused by disorder of liquid crystal alignment between pixels from being perceived or preventing diffusing light from entering a plurality of adjacent pixels. An organic resin containing black pigment such as carbon black or low-valent titanium oxide whose oxidation number is smaller than that of titanium dioxide can be used for the blocking film 333. Alternatively, a film of chromium can be used for the blocking film.

Injection of liquid crystal for forming the liquid crystal layer 328 may be performed by a dispenser method (dripping method) or a dipping method (pumping method).

A color filter that selectively transmits light in a specific wavelength region may be provided over the substrate 327.

This embodiment can be implemented in appropriate combination with the above embodiment.

Embodiment 3

In this embodiment, a manufacturing method of the liquid crystal display device illustrated in the cross-sectional views of FIG. 5 according to one embodiment of the present invention will be described with reference to FIGS. 7A to 7D and FIGS. 8A to 8C. Note that in this embodiment, the case where the transistor 301 is an n-channel transistor is given as an example.

Figure 7A:
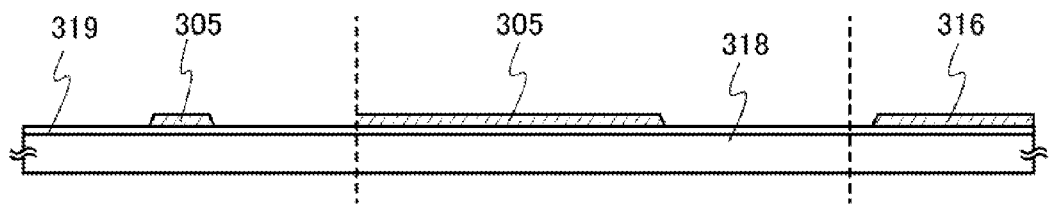
FIGS. 7A to 7D illustrate a manufacturing method of a liquid crystal display device.

First, the insulating film 319 is formed over the substrate 318, and then, the conductive films 305 and 316 are formed over the insulating film 319 as illustrated in FIG. 7A.

Although there is no particular limitation on a material which can be used as the substrate 318, it is necessary that the material have at least heat resistance high enough to withstand heat treatment to be performed later. For example, a glass substrate formed by a fusion process or a float process, a quartz substrate, a semiconductor substrate, a ceramic substrate, or the like can be used as the substrate 318. In the case where a glass substrate is used and the temperature at which the heat treatment is to be performed later is high, a glass substrate whose strain point is higher than or equal to 730° C. is preferably used.

It is not always necessary to provide the insulating film 319, but the insulating film 319 can prevent an alkali metal such as Na or an alkaline earth metal contained in the substrate 318 from diffusing to the active layer 306 formed later, thereby preventing an adverse effect on characteristics of the transistor 301. The insulating film 319 is formed using an insulating material such as silicon oxide, silicon nitride, silicon oxynitride, silicon nitride oxide, or aluminum nitride.

In this specification, in oxynitride, the amount of oxygen is larger than that of nitrogen, and in nitride oxide, the amount of nitrogen is larger than that of oxygen.

The conductive films 305 and 316 can be formed in such a manner that a conductive film is formed so as to cover the insulating film 319, and then, the conductive film is processed (patterned) into predetermined shapes. The conductive film can be formed by a CVD method, a sputtering method, an evaporation method, a spin coating method, or the like. As the conductive film for forming the conductive films 305 and 316, any of the following materials can be used: an element selected from aluminum, chromium, copper, tantalum, titanium, molybdenum, or tungsten; an alloy containing any of these elements; an alloy film containing the above elements in combination; and the like. Alternatively, a structure may be employed in which a film of a refractory metal such as chromium, tantalum, titanium, molybdenum, or tungsten is stacked over or below a metal film of aluminum or copper. Aluminum or copper is preferably used in combination with a refractory metal material in order to prevent a heat resistance problem and a corrosive problem. As the refractory metal material, molybdenum, titanium, chromium, tantalum, tungsten, neodymium, scandium, yttrium, or the like can be used.

Further, the conductive film for forming the conductive films 305 and 316 may have a single-layer structure or a layered structure of two or more layers. For example, a single-layer structure of an aluminum film containing silicon, a two-layer structure in which a titanium film is stacked over an aluminum film, a three-layer structure in which a titanium film, an aluminum film, and a titanium film are stacked in this order, and the like can be given.

For the conductive film for forming the conductive films 305 and 316, a conductive metal oxide may be used. As the conductive metal oxide, indium oxide, tin oxide, zinc oxide, a mixture of indium oxide and tin oxide, a mixture of indium oxide and zinc oxide, or the metal oxide material containing silicon or silicon oxide can be used.

In the case where heat treatment is performed after the formation of the conductive film, the conductive film preferably has heat resistance high enough to withstand the heat treatment.

In this embodiment, a conductive film formed by stacking a 50-nm-thick titanium film, a 100-nm-thick aluminum film, and a 50-nm-thick titanium film in this order is used for forming the conductive films 305 and 316.

Alternatively, the conductive films 305 and 316 may be selectively formed by a droplet discharge method without using a mask. A droplet discharge method is a method for forming a predetermined pattern by discharge or ejection of a droplet containing a predetermined composition from an orifice, and includes an inkjet method in its category.

The conductive films 305 and 316 can be formed in such a manner that the conductive film is etched into desired tapered shapes by an inductively coupled plasma (ICP) etching method in which the etching condition (e.g., the amount of electric power applied to a coil-shaped electrode layer, the amount of electric power applied to an electrode layer on the substrate side, and the electrode temperature on the substrate side) is controlled as appropriate. In addition, angles and the like of the tapered shapes may also be controlled by the shape of a mask. Note that as an etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

Figure 7B:
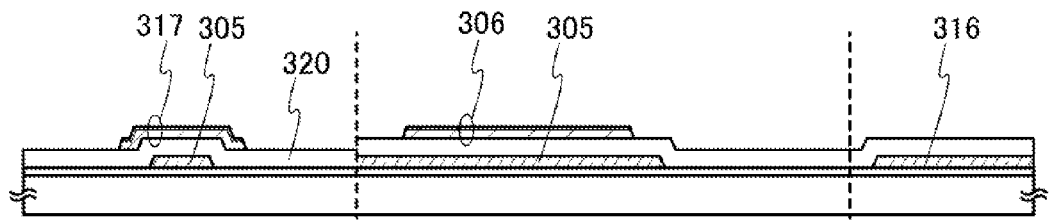

Next, the gate insulating film 320 is formed over the conductive films 305 and 316, and then, the semiconductor layer 317 and the active layer 306 are formed so as to overlap with the conductive film 305 with the gate insulating film 320 interposed therebetween as illustrated in FIG. 7B.

The gate insulating film 320 can be formed of a single layer or a stack of layers using silicon oxide, silicon nitride oxide, silicon oxynitride, silicon nitride, hafnium oxide, aluminum oxide, tantalum oxide, yttrium oxide, hafnium silicate ($HfSi_xO_y$, (x>0, y>0)), hafnium silicate ($HfSi_xO_y$, (x>0, y>0)) to which nitrogen is added, hafnium aluminate ($HfAl_xO_y$, (x>0, y>0)) to which nitrogen is added, or the like by a plasma CVD method, a sputtering method, or the like.

The thickness of the gate insulating film 320 can be, for example, greater than or equal to 1 nm and less than or equal to 500 nm, preferably greater than or equal to 10 nm and less than or equal to 400 nm. In this embodiment, a single-layer insulating film containing silicon nitride with a thickness of about 300 nm formed by a plasma CVD method is used as the gate insulating film 320.

In a process of forming the gate insulating film 320 by a plasma CVD method, glow discharge plasma is generated by applying high-frequency power with a frequency of 3 MHz to 30 MHz, typically 13.56 MHz or 27.12 MHz, or high-frequency power in the VHF band with a frequency of 30 MHz to about 300 MHz, typically 60 MHz. Alternatively, glow discharge plasma is generated by applying high-frequency power at a microwave frequency of 1 GHz or higher. Note that pulsed oscillation by which high-frequency power is applied in a pulsed manner or continuous oscillation by which high-frequency power is applied continuously can be employed. In addition, by superimposing high-frequency power in the HF band and high-frequency power in the VHF band on each other, unevenness of plasma in a large-sized substrate is also reduced, so that uniformity can be improved and the deposition rate can be increased. When the gate insulating film 320 is formed at a high frequency (1 GHz or higher) using a microwave plasma CVD apparatus, the withstand voltage between the gate electrode and the drain and source electrodes can be improved, so that the highly reliable transistor 301 can be obtained.

Further, by forming a silicon oxide layer by a CVD method using an organosilane gas as the gate insulating film 320, the crystallinity of the semiconductor layer which is formed later can be improved, and the on-state current and the mobility of the transistor 301 can be increased. Examples of the organosilane gas include silicon-containing compounds such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), and trisdimethylaminosilane (chemical formula: $SiH(N(CH_3)_2)_3$).

The semiconductor layer 317 and the active layer 306 have a structure in which a microcrystalline semiconductor layer, an amorphous semiconductor layer, and an impurity semiconductor layer are sequentially stacked. Specifically, a first microcrystalline semiconductor layer serving as a seed crystal is formed, and a second microcrystalline semiconductor layer obtained by crystal growth of the first microcrystalline semiconductor layer as a seed crystal and an amorphous semiconductor layer over the second microcrystalline semiconductor layer are formed, and then, an impurity semiconductor layer is formed. The semiconductor layer 317 and the active layer 306 are obtained in such a manner that the first microcrystalline semiconductor layer, the second microcrystalline semiconductor layer, the amorphous semiconductor layer, and the impurity semiconductor layer are formed, and then, a semiconductor layer including the first microcrystalline semiconductor layer, the second microcrystalline semiconductor layer, the amorphous semiconductor layer, and the impurity semiconductor layer is processed into desired shapes. The first microcrystalline semiconductor layer and the second microcrystalline semiconductor layer are microcrystalline semiconductor layers as the lowest layers of the semiconductor layer 317 and the active layer 306.

As the first microcrystalline semiconductor layer, microcrystalline silicon, microcrystalline silicon germanium, microcrystalline germanium, or the like can be used, for example. The thickness of the first microcrystalline semiconductor layer is preferably 3 nm to 100 nm, more preferably 5 nm to 50 nm.

The first microcrystalline semiconductor layer is formed by glow discharge plasma with a mixture of a deposition gas containing silicon or germanium and hydrogen in a process chamber of a plasma CVD apparatus. Alternatively, the first microcrystalline semiconductor layer is formed by glow discharge plasma with a mixture of a deposition gas containing silicon or germanium, hydrogen, and a rare gas such as helium, neon, argon, or krypton. Microcrystalline silicon, microcrystalline silicon germanium, microcrystalline germanium, or the like is formed using a mixture which is obtained by diluting the deposition gas containing silicon or germanium with hydrogen whose flow rate is 10 times to 2000 times, preferably 150 times to 1500 times that of the deposition gas. The deposition temperature in that case is preferably room temperature to 300° C., more preferably 200° C. to 280° C.

Typical examples of the deposition gas containing silicon or germanium include $SiH_4$, $Si_2H_6$, $GeH_4$, and $Ge_2H_6$.

Note that in the case where the gate insulating film 320 is formed using silicon nitride, an amorphous semiconductor is likely to be formed at an early stage of deposition of the first microcrystalline semiconductor layer, so that the crystallinity of the first microcrystalline semiconductor layer is low and characteristics such an on-state current and mobility of the transistor 301 are poor. Therefore, in the case where the gate insulating film 320 is formed using silicon nitride, the first microcrystalline semiconductor layer is preferably deposited under a condition that the dilution rate of the deposition gas containing silicon or germanium is high or under a low temperature condition. Typically, a high dilution rate condition in which the flow rate of hydrogen is 200 times to 2000 times, more preferably 150 times to 1500 times that of the deposition gas containing silicon or germanium is preferable. In addition, a low temperature condition in which the temperature for deposition of the first microcrystalline semiconductor layer is 200° C. to 250° C. is preferable. When the high dilution rate condition or the low temperature condition is employed, initial nucleation density is increased, an amorphous component formed over the gate insulating film 320 is reduced, and the crystallinity of the first microcrystalline semiconductor layer is improved. Further, when a surface of the gate insulating film 320 formed using silicon nitride is oxidized, adhesion with the first microcrystalline semiconductor layer is improved. As oxidation treatment, exposure to an oxidizing gas, plasma treatment in an oxidation gas atmosphere, or the like can be used.

In the case where the deposition pressure is 5 kPa or less at the time of forming the first microcrystalline semiconductor layer, the degradation efficiency of plasma is improved due to the use of a rare gas such as helium, argon, neon, krypton or xenon, so that the deposition rate of the first microcrystalline semiconductor layer is increased. Alternatively, in the case where the deposition pressure is more than 5 kPa at the time of forming the first microcrystalline semiconductor layer, the high-frequency power is amplified without using a rare gas, so that the deposition rate of the first microcrystalline semiconductor layer is increased. Further, since the deposition rate is increased, the amount of impurities mixed in the first microcrystalline semiconductor layer is reduced; thus, the crystallinity of the first microcrystalline semiconductor layer can be improved. Accordingly, the amount of on-state current and the mobility of the transistor 301 are increased and the throughput of the transistor 301 can also be increased.

When the first microcrystalline semiconductor layer is formed, glow discharge plasma is generated by applying high-frequency power with a frequency of 3 MHz to 30 MHz, typically 13.56 MHz or 27.12 MHz in the HF band, or high-frequency power with a frequency of 30 MHz to about 300 MHz in the VHF band, typically 60 MHz. Note that pulsed oscillation by which high-frequency power is applied in a pulsed manner or continuous oscillation by which high-frequency power is applied continuously can be employed. In addition, by superimposing high-frequency power in the HF band and high-frequency power in the VHF band on each other, unevenness of plasma in a large-sized substrate is also reduced, so that uniformity can be improved and the deposition rate can be increased.

The second microcrystalline semiconductor layer is formed over the first microcrystalline semiconductor layer. The second microcrystalline semiconductor layer can be formed over the first microcrystalline semiconductor layer using the first microcrystalline semiconductor layer as a seed crystal.

Like the first microcrystalline semiconductor layer, the second microcrystalline semiconductor layer is formed by glow discharge plasma with a mixture of hydrogen and a deposition gas containing silicon or germanium in a process chamber of the plasma CVD apparatus.

When the second microcrystalline semiconductor layer is formed, the flow ratio of hydrogen to the deposition gas containing silicon or germanium is set so that a microcrystalline semiconductor is formed, as in the case of forming the first microcrystalline semiconductor layer. Specifically, for formation of the second microcrystalline semiconductor layer, the flow ratio of hydrogen may be 10 times to 2000 times, preferably 150 times to 1500 times that of the deposition gas containing silicon or germanium.

The deposition pressure at the time of forming the second microcrystalline semiconductor layer is preferably higher than that at the time of forming the first microcrystalline semiconductor layer. When the deposition pressure at the time of forming the second microcrystalline semiconductor layer is high, the second microcrystalline semiconductor layer can be formed so as to fill a space between crystal grains in the first microcrystalline semiconductor layer.

The amorphous semiconductor layer is formed over the second microcrystalline semiconductor layer under a condition that crystal growth partly proceeds (condition that crystal growth is reduced). Specifically, the amorphous semiconductor layer is formed in a process chamber of the plasma CVD apparatus by glow discharge plasma with the use of a mixture of hydrogen, a deposition gas containing silicon or germanium, and a gas containing nitrogen. Examples of the gas containing nitrogen include ammonia, nitrogen, nitrogen fluoride, nitrogen chloride, chloroamine, and fluoroamine. Glow discharge plasma can be generated as in the case of the first microcrystalline semiconductor layer.

At the time of forming the amorphous semiconductor layer, the flow ratio of hydrogen may be 10 times to 150 times, preferably 20 times to 100 times that of the deposition gas containing silicon or germanium. Further, at the time of forming the amorphous semiconductor layer, the gas containing nitrogen is included in the source gas, so that crystal growth can be reduced than that in the deposition condition of the first microcrystalline semiconductor layer. Specifically, since the gas containing nitrogen is included in the source gas, the crystal, growth is partly reduced at an early stage of deposition of the amorphous semiconductor layer; therefore, a conical or pyramidal microcrystalline semiconductor region grows. Furthermore, at a middle stage or later stage of deposition, the crystal growth of the conical or pyramidal microcrystalline semiconductor is stopped, and only the amorphous semiconductor is deposited. In such a manner, the amorphous semiconductor layer can be formed. The nitrogen content in the amorphous semiconductor layer is preferably greater than or equal to $5\times10^{19}/cm^3$ and less than or equal to $5\times10^{20}/cm^3$.

The total thickness of the second microcrystalline semiconductor layer and the amorphous semiconductor layer is preferably 50 nm to 350 nm, more preferably 120 nm to 250 nm.

The impurity semiconductor layer is formed in a process chamber of the plasma CVD apparatus by glow discharge plasma with the use of a mixture of hydrogen, phosphine (diluted with hydrogen or silane), and a deposition gas containing silicon. The deposition gas containing silicon is diluted with hydrogen, in formation of amorphous silicon to which phosphorus is added or microcrystalline silicon to which phosphorus is added. In the case of manufacturing a p-channel transistor, the impurity semiconductor layer may be formed by glow discharge plasma using diborane instead of phosphine.

In this embodiment, the total thickness of the first microcrystalline semiconductor layer and the second microcrystalline semiconductor layer included in the semiconductor layer 317 and the active layer 306 is 80 nm, the thickness of the amorphous semiconductor layer is 70 nm, and the thickness of the impurity semiconductor layer is 50 nm.

Figure 7C:
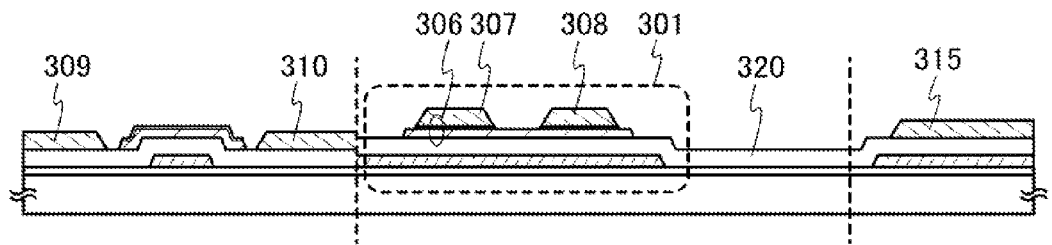

Next, a conductive film is formed so as to cover the gate insulating film 320 and the active layer 306, and then the conductive film is processed by etching or the like, whereby the conductive films 309, 310, 307, 308, and 315 are formed as illustrated in FIG. 7C. The conductive films 307 and 308 are formed over the active layer 306 so as to be separate from the side portion of the active layer 306. The conductive film 315 is formed so as to overlap with the conductive film 316 with the gate insulating film 320 interposed therebetween.

The conductive films 309, 310, 307, 308, and 315 can be formed using a material and a stacked structure which are similar to those of the conductive films 305 and 316.

Note that a Cu—Mg—Al alloy, a Cu—Mg—O alloy, a Cu—Ca—O alloy, a Cu—Mg—Al—O alloy, a Mo—Ti alloy, Ti, and Mo have high adhesion to an oxide film. Therefore, when a conductive film is formed using a stack of a lower conductive layer of a Cu—Mg—Al alloy, a Cu—Mg—O alloy, a Cu—Ca—O alloy, a Cu—Mg—Al—O alloy, a Mo—Ti alloy, Ti, or Mo and an upper conductive layer of Cu, and the formed conductive film having such a stacked structure is used to form the conductive films 309, 310, and 315, the adhesion between the gate insulating film 320 and the conductive films 309, 310, and 315 can be increased in the case where the insulating film 320 is an oxide film.

In formation of the conductive films 307 and 308 by etching, a portion of the impurity semiconductor layer in the active layer 306, which is not covered with the conductive films 307 and 308, is etched; thus, a pair of impurity semiconductor layers functioning as a source region and a drain region can be formed. In the above etching, part of the amorphous semiconductor layer in the active layer 306 may be etched.

Note that etching for forming the conductive films 307 and 308 and etching for forming the pair of impurity semiconductor layers functioning as a source region and a drain region may be performed as different steps instead of one step. In the case where the above two etchings are performed as one step, dry etching can be employed. In the case where the above two etchings are performed as different steps, the etching for forming the conductive films 307 and 308 can be performed by wet etching, and the etching for forming the pair of impurity semiconductor layers functioning as a source region and a drain region can be performed by dry etching.

Note that after the etching for forming the pair of impurity semiconductor layers functioning as a source region and a drain region is performed, dry etching may also be performed under the condition that the active layer 306 is not damaged so that an impurity such as a residue due to the former dry etching can be removed.

As an etching gas used for dry etching, $Cl_2$, $CF_4$, $N_2$, or the like is typically used. There is no particular limitation on the etching method, and for example, the dry etching is performed by a reactive ion etching (RIE) method, an inductively coupled plasma (ICP) etching method, an electron cyclotron resonance (ECR) etching method, a parallel plate (capacitive coupled plasma) etching method, a magnetron plasma etching method, a dual-frequency plasma etching method, or a helicon wave plasma etching method.

After the etching for forming the pair of impurity semiconductor layers functioning as a source region and a drain region, a surface of the active layer 306 may be subjected to plasma treatment such as water plasma treatment, oxygen plasma treatment, ammonia plasma treatment, or nitrogen plasma treatment. Water plasma treatment can be performed in such a manner that a gas containing water as a main component typified by water vapor ($H_2O$ vapor) is introduced into a reaction space and plasma is generated. After that, a resist mask is removed. After the dry etching, water plasma treatment is successively performed, whereby a residue of the resist mask used in the dry etching can be removed. Further, by the plasma treatment, a higher insulating property between the source region and the drain region can be obtained. Thus, in the resulting transistor 301, off-state current can be reduced and a variation in characteristics can be reduced.

Through the above steps, as illustrated in FIG. 7C, the transistor 301 whose channel formation region is formed using a microcrystalline semiconductor layer can be manufactured.

Figure 7D:
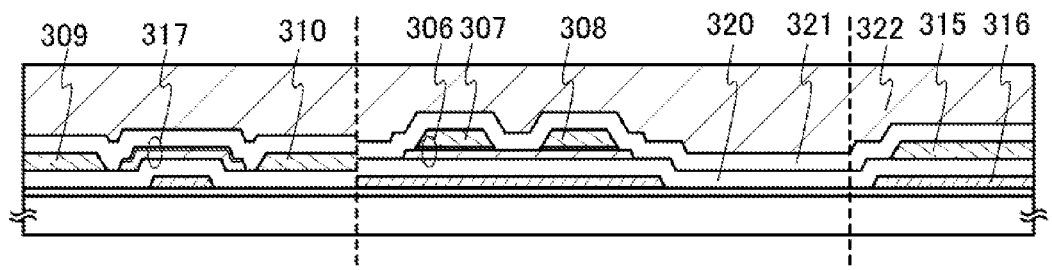

Next, as illustrated in FIG. 7D, the insulating films 321 and 322 are formed. Although the insulating films 321 and 322 are stacked in this embodiment, a single-layer insulating film or a stacked structure of three or more layers may be employed.

For example, the insulating films 321 and 322 can be formed using an organic material having heat resistance such as acrylic, polyimide, benzocyclobutene, polyamide, or epoxy. In addition to such organic materials, a low-dielectric constant material (a low-k material), a siloxane-based resin, silicon oxide, silicon nitride, silicon oxynitride, silicon nitride oxide, PSG (phosphosilicate glass), BPSG (borophosphosilicate glass), alumina, or the like can be used. A siloxane-based resin refers to a material in which a skeleton structure is formed by the bond of silicon (Si) and oxygen (O). As well as hydrogen, at least one of fluorine, a fluoro group, and an organic group (e.g., an alkyl group or aromatic hydrocarbon) may be used as a substituent. For the formation of the insulating films 321 and 322, the following method can be used depending on the material of the insulating films 321 and 322: a CVD method, a sputtering method, a spin coating method, a dipping method, a spray coating method, a droplet discharge method (e.g., an ink-jet method), a printing method (e.g., screen printing or offset printing), or a tool (equipment) such as a doctor knife, a roll coater, a curtain coater, or a knife coater.

For the insulating films 321 and 322, a silicon oxide film formed by chemical vapor deposition using organosilane can be used. For organosilane, tetraethoxysilane (TEOS) (chemical formula: $Si(OC_2H_5)_4$), trimethylsilane (TMS) (chemical formula: $(CH_3)_3SiH$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), trisdimethylaminosilane (chemical formula: $SiH(N(CH_3)_2)_3$), or the like can be used. Needless to say, silicon oxide, silicon oxynitride, silicon nitride, silicon nitride oxide, or the like may be formed using inorganic silane such as monosilane, disilane, or trisilane.

In this embodiment, the insulating film 321 is formed using silicon nitride to a thickness of 300 nm, and the insulating film 322 is formed using acrylic to a thickness of 1.5 μm.

Figure 8A:
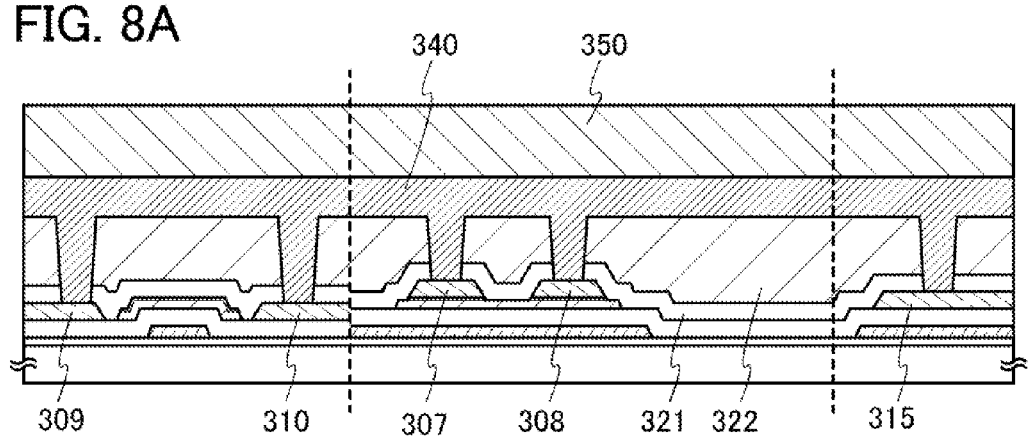
FIGS. 8A to 8C illustrate a manufacturing method of a liquid crystal display device.

Next, as illustrated in FIG. 8A, openings are formed in the insulating films 321 and 322 so as to expose part of the conductive film 309, part of the conductive film 310, part of the conductive film 307, part of the conductive film 308, and part of the conductive film 315. Then, after a conductive film 340 is formed over the insulating film 322 so as to be in contact with the conductive film 309, the conductive film 310, the conductive film 307, the conductive film 308, and the conductive film 315 through the openings, an insulating film 350 is formed over the conductive film 340.

The conductive film 340 can be formed using a material and a stacked structure which are similar to those of the conductive films 305 and 316. In particular, in processing by dry etching, when a conductive material such as tungsten or tantalum nitride is used, the conductive material or a reaction product of the conductive material and the gas used for the dry etching is easily deposited on side portions of the insulating films 323, 324, 325, and 326 formed as masks later. In processing by the dry etching, in the case where the conductive film 340 is formed using a conductive material which is not easily deposited, like aluminum, on the side portions of the insulating films 323, 324, 325, and 326 formed as masks later, such a conductive material is preferably used in combination with a conductive material which is easily deposited such as tungsten or tantalum nitride.

Therefore, for example, when a two-layer structure in which a tungsten film is stacked over an aluminum film, or a two-layer structure in which a tantalum nitride film is stacked over an aluminum film is employed, an advantage of aluminum such as high conductivity can be utilized and, in addition, an advantage that conductive films can be easily deposited on the side portions of the insulating films 323, 324, 325, and 326 in dry etching to be performed later can be obtained.

Further, by forming a barrier-metal film using titanium, which is a highly-reducible element, even if a thin oxide film is formed on the conductive films 309, 310, 307, 308, and 315, the oxide film is reduced by titanium contained in the barrier metal film, so that preferable contact between the conductive film 340 and the conductive films 309, 310, 307, 308, and 315 can be obtained.

Therefore, in the case of a three-layer structure in which a titanium film, an aluminum film, and a tungsten film are stacked in this order or a three-layer structure in which a titanium film, an aluminum film, and a tantalum nitride film are stacked in this order, an advantage of lower resistance in a connection portion to the lower conductive films 309, 310, 307, 308, and 315 can be obtained in addition to the above-described two advantages.

In order to easily deposit a conductive film on the side portions of the insulating films 323, 324, 325, and 326 in dry etching to be performed later, the thickness of the conductive film 340 is preferably at least 50 nm or more, more preferably 100 nm or more. Specifically, the thickness of the conductive film 340 is preferrably greater than or equal to 50 nm and less than or equal to 1.5 μm, more preferably greater than or equal to 100 nm and less than or equal to 1.0 μm.

In this embodiment, a 200-nm-thick titanium film, a 600-nm-thick aluminum film, and a 200-nm-thick tungsten film are stacked in this order to form the conductive film 340.

It is preferable that the insulating film 350 be a highly planar insulating film in order to uniform the heights of the pixel electrode 302, the common electrode 303, the conductive film 312, and the conductive film 314 which are formed later. The insulating film 350 may be formed using a single layer of an insulating film or a plurality of stacked insulating films.

For example, the insulating film 350 can be formed using an organic material having heat resistance such as acrylic, polyimide, benzocyclobutene, polyamide, or epoxy. As an alternative to such organic materials, it is possible to use a siloxane-based resin or the like. For the formation of the insulating film 350, the following method can be used depending on the material of the insulating film 350: a spin coating method, a dipping method, a spray coating method, a droplet discharge method (e.g., an ink-jet method), a printing method (e.g., screen printing or offset printing), or a tool (equipment) such as a doctor knife, a roll coater, a curtain coater, or a knife coater.

For the insulating film 350, a silicon oxide film formed by chemical vapor deposition using organosilane can be used. For organosilane, tetraethoxysilane (TEOS) (chemical formula: $Si(OC_2H_5)_4$), trimethylsilane (TMS) (chemical formula: $(CH_3)_3SiH$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), trisdimethylaminosilane (chemical formula: $SiH(N(CH_3)_2)_3$), or the like can be used. Needless to say, silicon oxide, silicon oxynitride, silicon nitride, silicon nitride oxide, or the like may be formed using inorganic silane such as monosilane, disilane, or trisilane.

In this embodiment, the insulating film 350 is formed using acrylic to a thickness of 1 µm.

Figure 8B:
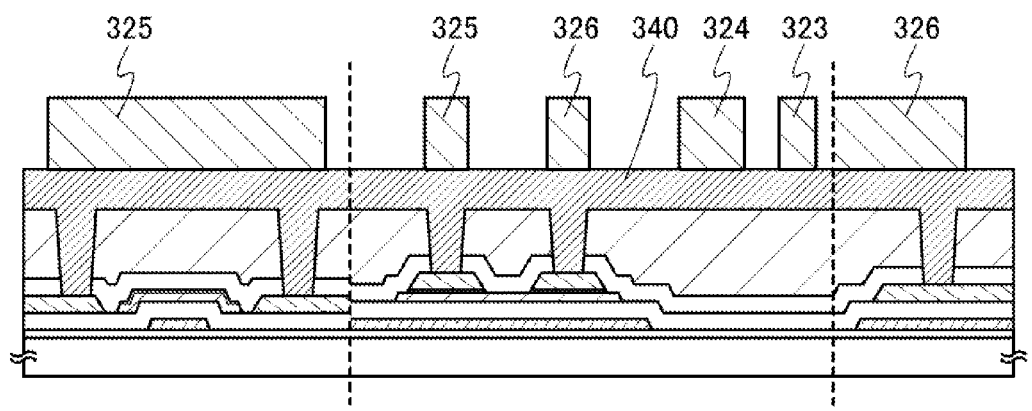

Next, as illustrated in FIG. 8B, the insulating film 350 is processed into desired shapes, whereby the island-shaped insulating films 323, 324, 325, and 326 are formed. The shape of the insulating film 350 can be processed by dry etching or wet etching. In particular, dry etching is preferable because the gradient of the side portions of the insulating films 323, 324, 325, and 326 can be made steep. The gradient of the side portions of the insulating films 323, 324, 325, and 326 is preferably steep due to the following reason: the steeper the gradient of the side portions of the insulating films 323, 324, 325, and 326 is, the more likely a rabbit ear is to be formed through dry etching of the conductive film 340, and the steeper the side portions of the pixel electrode 302, the common electrode 303, the conductive film 312, and the conductive film 314 obtained after the dry etching becomes.

Specifically, the tapered angle θ formed between surfaces of the side portions of the insulating films 323, 324, 325, and 326 and a surface of the conductive film 340 serving as a base is greater than or equal to 50° and less than or equal to 90°, preferably greater than or equal to 60° and less than or equal to 90°.

Figure 8C:
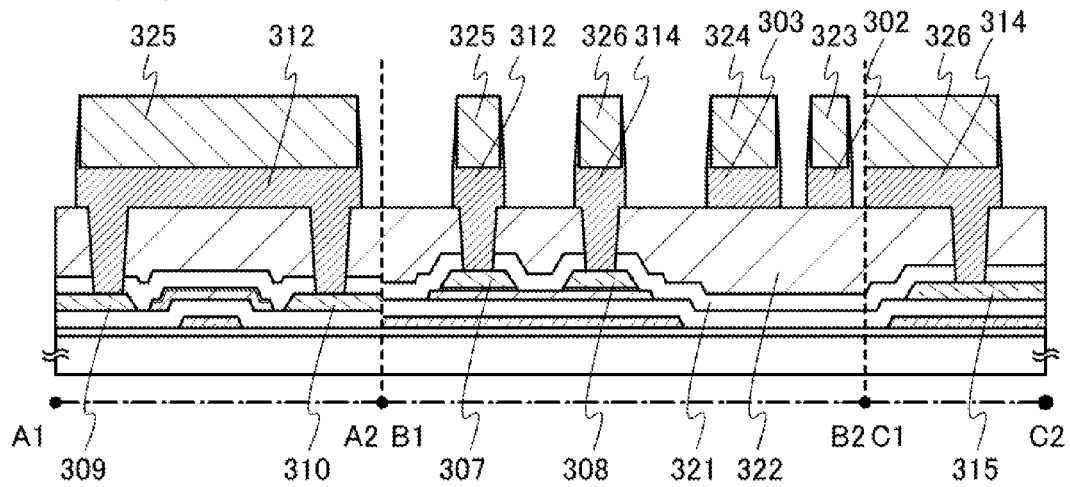

Next, as illustrated in FIG. 8C, the shape of the conductive film 340 is processed by dry etching with the use of the insulating films 323, 324, 325, and 326 as masks, whereby the island-shaped pixel electrode 302, common electrode 303, conductive film 312, and conductive film 314 are formed. The conductive film 312 is connected to the conductive films 307, 309, and 310 through the openings formed in the insulating films 321 and 322. The conductive film 314 is connected to the conductive films 308 and 315 through the openings formed in the insulating films 321 and 322.

Through the above dry etching, the conductive material of the conductive film 340 or a reaction product of the conductive material and the gas used for the dry etching is deposited on the side portions of the insulating films 323, 324, 325, and 326. Therefore, the pixel electrode 302 exists on the side portion of the insulating film 323 as well as the lower portion of the insulating film 323. The common electrode 303 exists on the side portion of the insulating film 324 as well as the lower portion of the insulating film 324. The insulating film 312 exists on the side portion of the insulating film 325 as well as the lower portion of the insulating film 325. The conductive film 314 exists on the side portion of the insulating film 326 as well as the lower portion of the insulating film 326.

The substrate temperature is preferably kept low during the dry etching in order to easily deposit the conductive material or the reaction product on the side portions of the insulating films 323, 324, 325, and 326 through the above dry etching. For example, in the case where tungsten, tantalum nitride, or the like is used for the conductive film 340, the substrate temperature is preferably higher than or equal to −20° C. and lower than or equal to 0° C. so that a rabbit ear is easily formed.

The dry etching can be performed by a reactive ion etching (RIE) method, an inductively coupled plasma (ICP) etching, method, an electron cyclotron resonance (ECR) etching method, a parallel plate (capacitive coupled plasma) etching method, a magnetron plasma etching method, a dual-frequency plasma etching method, or a helicon wave plasma etching method.

As the etching gas, a chlorine-based gas such as chlorine, boron chloride, silicon chloride, boron trichloride, or carbon tetrachloride; a fluorine-based gas such as carbon tetrafluoride, sulfur fluoride, or nitrogen fluoride; oxygen; or the like can be used as appropriate.

Specifically, in this embodiment, since a titanium film, an aluminum film, and a tungsten film are stacked in this order in the conductive film 340, dry etching is performed with the conditions changed on the way of the process, as follows. First, the conditions are set so that the flow rates of chlorine, carbon tetrafluoride, and oxygen in the etching gas are 45 sccm, 55 sccm, and 55 sccm respectively, the reaction pressure is 0.67 Pa, the temperature of the lower electrode is −10° C., the RF (13.56 MHz) power which is supplied to the coil-shaped electrode is 3000 W, and the power which is supplied to the lower electrode (on the bias side) is 140 W. Then, the conditions are set so that the flow rates of chlorine and boron trichloride in the etching gas are 20 sccm and 60 sccm respectively, the reaction pressure is 1.9 Pa, the temperature of the lower electrode is −10° C., the RF (13.56 MHz) power which is supplied to the coil-shaped electrode is 450 W, and the power which is supplied to the lower electrode (on the bias side) is 100 W.

Alternatively, in the case where a titanium film, an aluminum film, and a tantalum nitride film are stacked in this order in the conductive film 340, dry etching is performed with the conditions changed on the way of the process, as follows. First, the conditions are set so that the flow rate of chlorine in the etching gas' is 100 sccm, the reaction pressure is 2.0 Pa, the temperature of the lower electrode is −10° C., the RF (13.56 MHz) power which is supplied to the coil-shaped electrode is 1000 W, and the power which is supplied to the lower electrode (on the bias side) is 50 W. Then, the conditions are set so that the flow rates of chlorine and boron trichloride in the etching gas are 20 sccm and 60 sccm respectively, the reaction pressure is 1.9 Pa, the temperature of the lower electrode is −10° C., the RF (13.56 MHz) power which is supplied to the coil-shaped electrode is 450 W, and the power which is supplied to the lower electrode (on the bias side) is 100 W.

After the above-described steps, the substrate 327 is provided so as to face the substrate 318, and the liquid crystal layer 328 is provided therebetween. Thus, the liquid crystal display device illustrated in FIG. 5 can be obtained.

This embodiment can be implemented in appropriate combination with any of the above embodiments.

Embodiment 4

Figure 9:
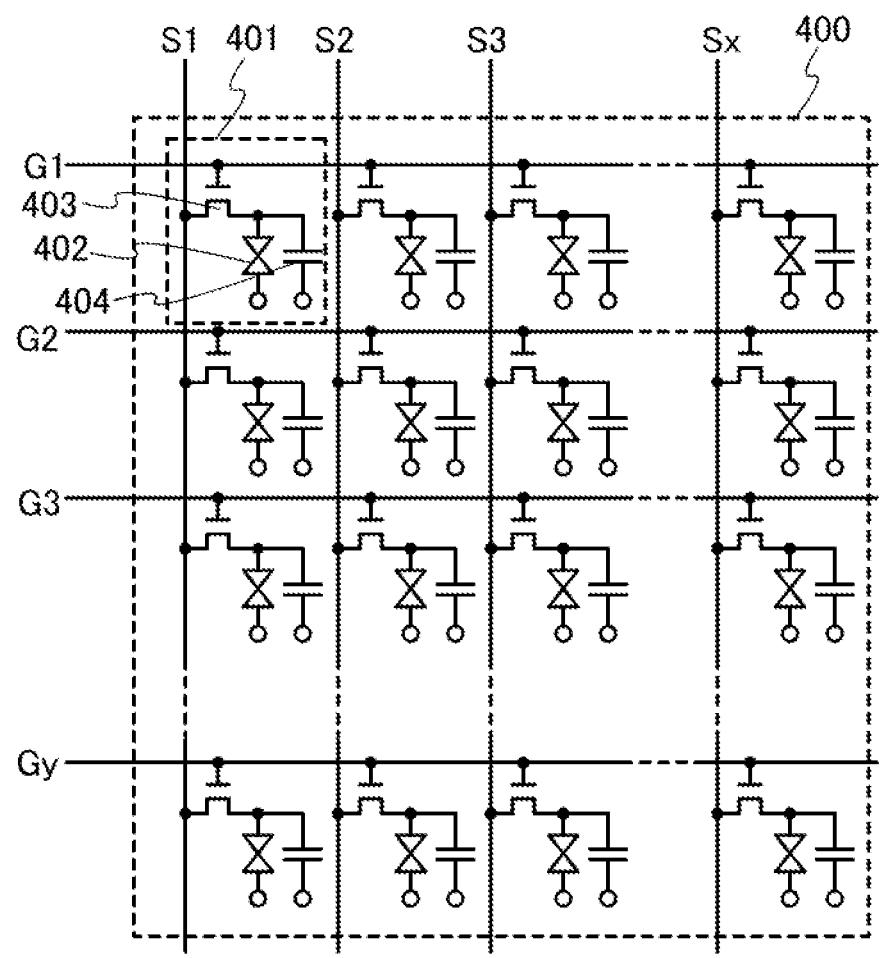
FIG. 9 is a circuit diagram of a pixel portion.

In this embodiment, a specific structure of a pixel portion of a liquid crystal display device according to one embodiment of the present invention will be described. FIG. 9 illustrates a specific example of a circuit diagram of a pixel portion 400.

In FIG. 9, each of pixels 401 in the pixel portion 400 includes a liquid crystal element 402, a transistor 403 for controlling supply of an image signal to the liquid crystal element 402, and a capacitor 404 for holding a voltage between a pixel electrode and a common electrode of the liquid crystal element 402. The liquid crystal element 402 includes the pixel electrode, the common electrode, and a liquid crystal layer having liquid crystal to which a voltage between the pixel electrode and the common electrode is applied.

A liquid crystal material that can be used in a horizontal electric field mode, such as liquid crystal exhibiting a blue phase, can be used for the liquid crystal layer.

A plurality of scan lines for selecting the plurality of pixels 401 and a plurality of signal lines for supplying image signals to the selected pixels 401 are connected to the plurality of pixels 401. Specifically, each of the pixels 401 is connected to at least one of signal lines S1 to Sx and at least one of scan lines G1 to Gy.

The transistor 403 controls whether a potential of the signal line is applied to the pixel electrode of the liquid crystal element 402. A predetermined reference potential is applied to the common electrode of the liquid crystal element 402.

The terms "source terminal" and "drain terminal" included in a transistor interchange with each other depending on the Polarity of the transistor or the levels of potentials applied to the respective terminals. In general, in an n-channel transistor, a terminal to which a lower potential is applied is called a source terminal, and a terminal to which a higher potential is applied is called a drain terminal. Further, in a p-channel transistor, a terminal to which a lower potential is applied is called a drain terminal, and a terminal to which a higher potential is applied is called a source terminal. A specific connection relation of the transistor 403 and the liquid crystal element 402 will be described below on the assumption that one of a source terminal and a drain terminal is a first terminal and the other is a second terminal.

In addition, a "source terminal" of a transistor means a source region which is part of an active layer or a source electrode which is connected to an active layer. Similarly, a "drain terminal" of a transistor means a drain region which is part of an active layer or a drain electrode which is connected to an active layer.

A gate electrode of the transistor 403 is connected to any one of the scan lines G1 to Gy. A first terminal of the transistor 403 is connected to any one of the signal lines S1 to Sx, and a second terminal of the transistor 403 is connected to the pixel electrode of the liquid crystal element 402.

Note that the pixel 401 may further have another circuit element such as a transistor, a diode, a resistor, a capacitor, or an inductor as needed.

Note that FIG. 9 illustrates a case where one transistor 403 is used as a switching element in the pixel 401; however, one embodiment of the present invention is not limited to this structure. A plurality of transistors may be used as one switching element. In the case where a plurality of transistors function as one switching element, the plurality of transistors may be connected to each other in parallel, in series, or in combination of parallel connection and series connection.

In this specification, the state in which the transistors are connected to each other in series, for example, means a state in which only one of a first terminal and a second terminal of a first transistor is connected to only one of a first terminal and a second terminal of a second transistor. Further, the state in which the transistors are connected to each other in parallel means a state in which the first terminal of the first transistor is connected to the first terminal of the second transistor and the second terminal of the first transistor is connected to the second terminal of the second transistor.

Note that the term "connection" in this specification refers to electrical connection and corresponds to the state in which current, voltage, or a potential can be supplied or transmitted. Accordingly, a connection state means not only a state of direct connection but also a state of indirect connection through a circuit element such as a wiring, a resistor, a diode, or a transistor so that current, voltage, or a potential can be supplied or transmitted.

Even when a circuit diagram illustrates independent components which are connected to each other, there is a case where one conductive film has functions of a plurality of components such as the case where part of a wiring functions as an electrode. In this specification, the term "connection" also means such a case where one conductive film has functions of a plurality of components.

Next, an example of operation of the pixel portion 400 in FIG. 9 will be described.

First, the scan line G1 is selected by inputting a signal with a pulse to the scan line G1. In each of the plurality of pixels 401 connected to the selected scan line G1, the transistor 403 is turned on. When a potential of an image signal is supplied to the signal lines S1 to Sx in the state where the transistor 403 is on, electric charge is accumulated in the capacitor 404 and the potential of the image signal is applied to the pixel electrode of the liquid crystal element 402 through the on-state transistor 403.

In the liquid crystal element 402, the orientation of liquid crystal molecules is changed according to the level of the voltage applied between the pixel electrode and the common electrode, whereby transmittance is changed. Accordingly, the transmittance of the liquid crystal element 402 can be controlled by the potential of the image signal; thus, a gray scale can be displayed.

When input of image signals to the signal lines S1 to Sx is completed, the selection of the scan line G1 is terminated. When the selection of the scan line G1 is terminated, the transistors 403 are turned off in the pixels 401 connected to the scan line G1. Then, voltage applied between the pixel electrode and the common electrode is held in the liquid crystal element 402, whereby display of a gray scale is maintained.

Next, the scan lines G2 to Gy are sequentially selected, and operations similar to that in the period during which the scan line G1 is selected are sequentially performed in the pixels connected to the scan lines G2 to Gy. Through the above operations, an image can be displayed in the pixel portion 400.

A liquid crystal display device according to one embodiment of the present invention may display a color image by using a color filter or may display a color image by sequentially turning on a plurality of light sources whose hues are different from each other.

In the case of displaying a color image by sequentially turning on a plurality of light sources whose hues are different from each other, images corresponding to respective colors need to be displayed in one frame period. Therefore, an image signal is written to a pixel portion more frequently than that in a color filter method, so that the frame frequency is likely to be lowered. However, in one embodiment of the present invention, liquid crystal exhibiting a blue phase, whose response speed is as small as 1 msec or less, is used for a liquid crystal layer of a liquid crystal element. Therefore, an image signal is written to a pixel at high speed so that the frame frequency is not likely to be lowered. Accordingly, a phenomenon called color break in which images corresponding to different colors are perceived separately without being synthesized and generation of flickers can be prevented.

This embodiment can be implemented in appropriate combination with any of the above embodiments.

Embodiment 5

In this embodiment, a configuration of a driver circuit controlling the operation of a pixel portion will be described.

Figure 10:
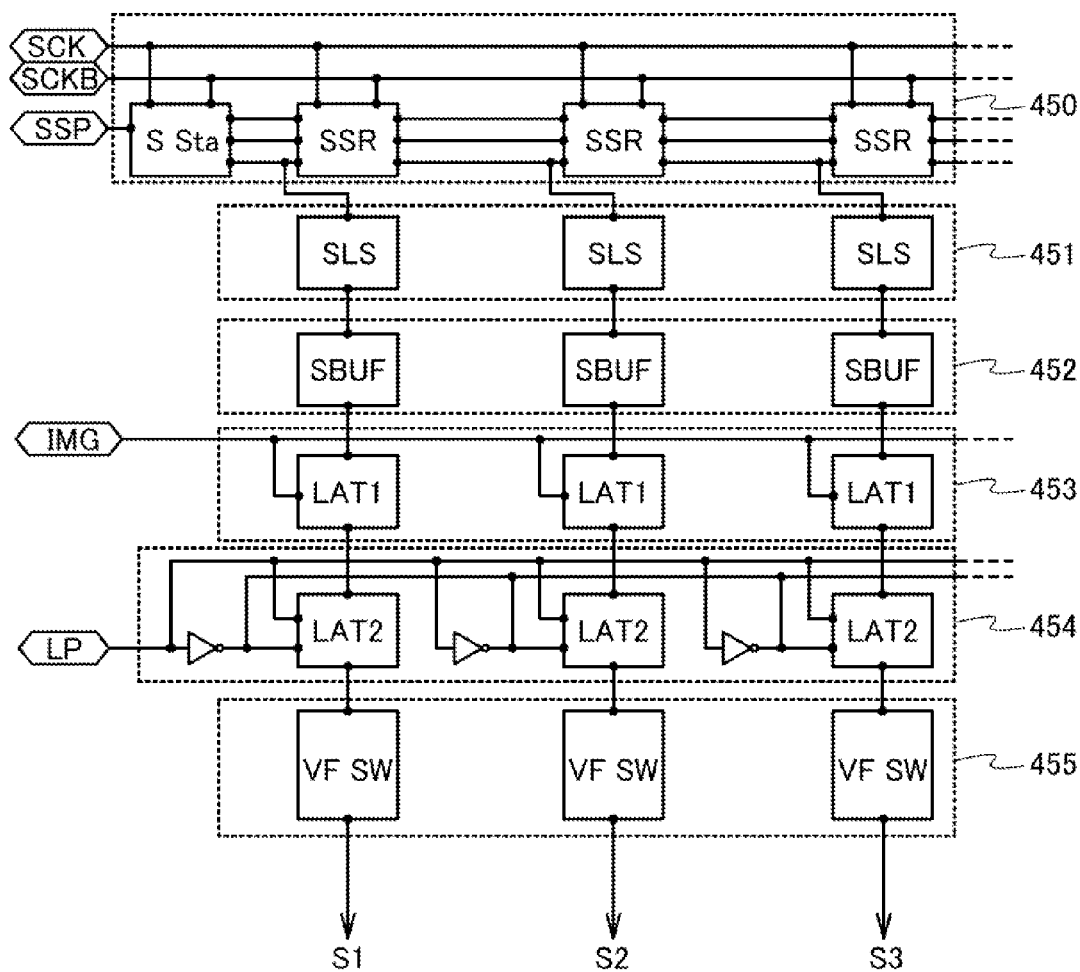
FIG. 10 illustrates a configuration of a signal line driver circuit.

FIG. 10 shows a structural example of a signal line driver circuit. The signal line driver circuit in FIG. 10 includes a shift register 450, a level shifter 451, a digital buffer 452, a first memory circuit 453, a second memory circuit 454, and an analog buffer 455.

Next, the operation of the signal line driver circuit is described. When a start pulse signal SSP, a clock signal SCK, and a clock signal SCKB having the opposite polarity to the clock signal SCK are input to the shift register 450, the shift register 450 generates a timing signal whose pulse is sequentially shifted.

The amplitude of the potential of a timing signal output from the shift register 450 is adjusted in the level shifter 451, and the resulting signal is input to the first memory circuit 453 through the digital buffer 452.

An image signal IMG is input to the first memory circuit 453. When the timing signal is input to the first memory circuit 453, the image signal IMG is sampled in response to a pulse of the timing signal and sequentially written to a plurality of memory elements included in the first memory circuit 453. That is, the image signal IMG which is input to the signal line driver circuit in series is written to the first memory circuit 453 in parallel. The image signal IMG written to the first memory circuit 453 is held.

Note that the image signal IMG may be sequentially written to a plurality of memory elements included in the first memory circuit 453; or so-called division driving may be performed, in which the plurality of memory elements included in the first memory circuit 453 is divided into several groups and the image signal IMG is input to the groups in parallel. Note that the number of memory elements in each group in this case is referred to as the number of divisions. For example, in the case where a memory circuit is divided into groups so that each group has four memory elements, division driving is performed with four divisions.

A latch signal LP is input to the second memory circuit 454. After writing of the image signal IMG to the first memory circuit 453 is completed, the image signal IMG held in the first memory circuit 453 is written to the second memory circuit 454 and held therein all at once in response to a pulse of a latch signal LP input to the second memory circuit 454 in a blanking period (flyback period). Again, in response to the timing signal from the shift register 450, the next image signal IMG is sequentially written to the first memory circuit 453 in which transmission of the image signal IMG to the second memory circuit 454 has been completed. In the one line period of the second round, the image signal IMG which is written to and held in the second memory circuit 454 is transmitted to a signal line through the analog buffer 455.

Figure 11:
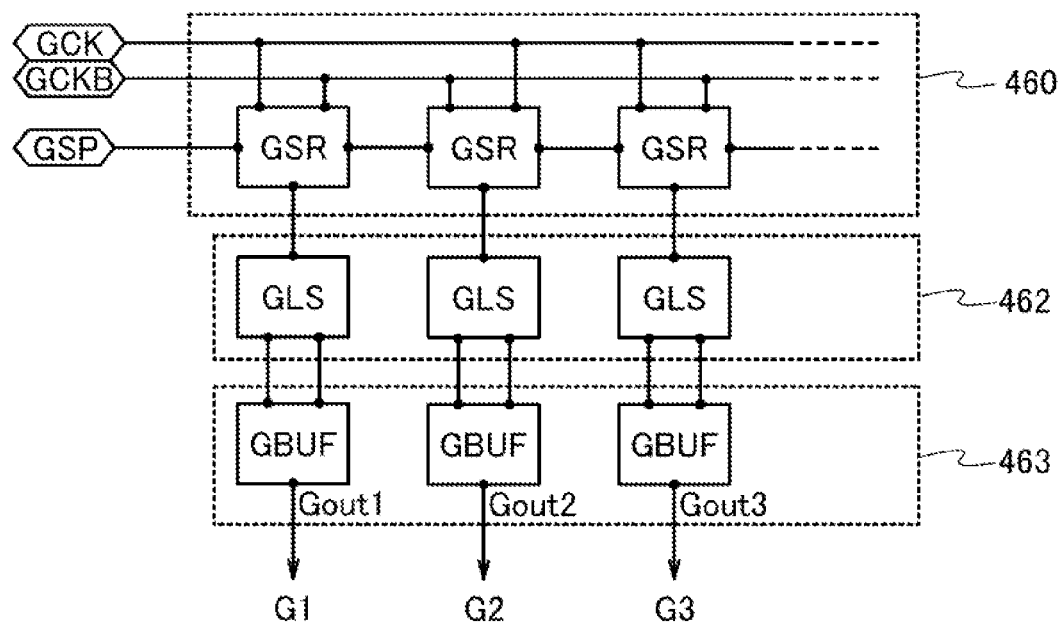
FIG. 11 illustrates a configuration of a scan line driver circuit.

Next, the structure of each scan line driver circuit is described. FIG. 11 shows a structural example of a scan line driver circuit. The scan line driver circuit in FIG. 11 includes a shift register 460, a level shifter 462, and a digital buffer 463.

The operation of the scan line driver circuit in FIG. 11 is described. In the scan line driver circuit, when a start pulse signal GSP, a clock signal GCK, and a clock signal GCKB having the opposite polarity to the clock signal GCK are input to the shift register 460, a selection signal Gout whose pulse is sequentially shifted is generated.

Note that FIG. 11 shows the case where the shift register 460 includes a plurality of flip-flops GSR. Each of the plurality of flip flops GSR outputs the selection signal Gout. Specifically, the flip-flop GSR in a first stage outputs a selection signal Gout1, the flip-flop GSR in a second stage outputs a selection signal. Gout2, and the flip-flop GSR in a third stage outputs a selection signal Gout3. This means, if the shift register 460 has y-stage flip flops GSR, the shift register 460 outputs selection signals Gout1 to Gouty.

The amplitude of the potential of the selection signal Gout output from the shift register 460 is adjusted in the level shifter 462, and the resulting signal is input to the scan line of the pixel portion through the digital buffer 452.

The pixel included in the pixel portion is selected by the selection signal Gout input from the scan line driver circuit. The image signal IMG transmitted from the signal line driver circuit to the pixel portion through the signal line is input to the selected pixel.

This embodiment can be implemented in appropriate combination with any of the above embodiments.

Embodiment 6

Figure 12:
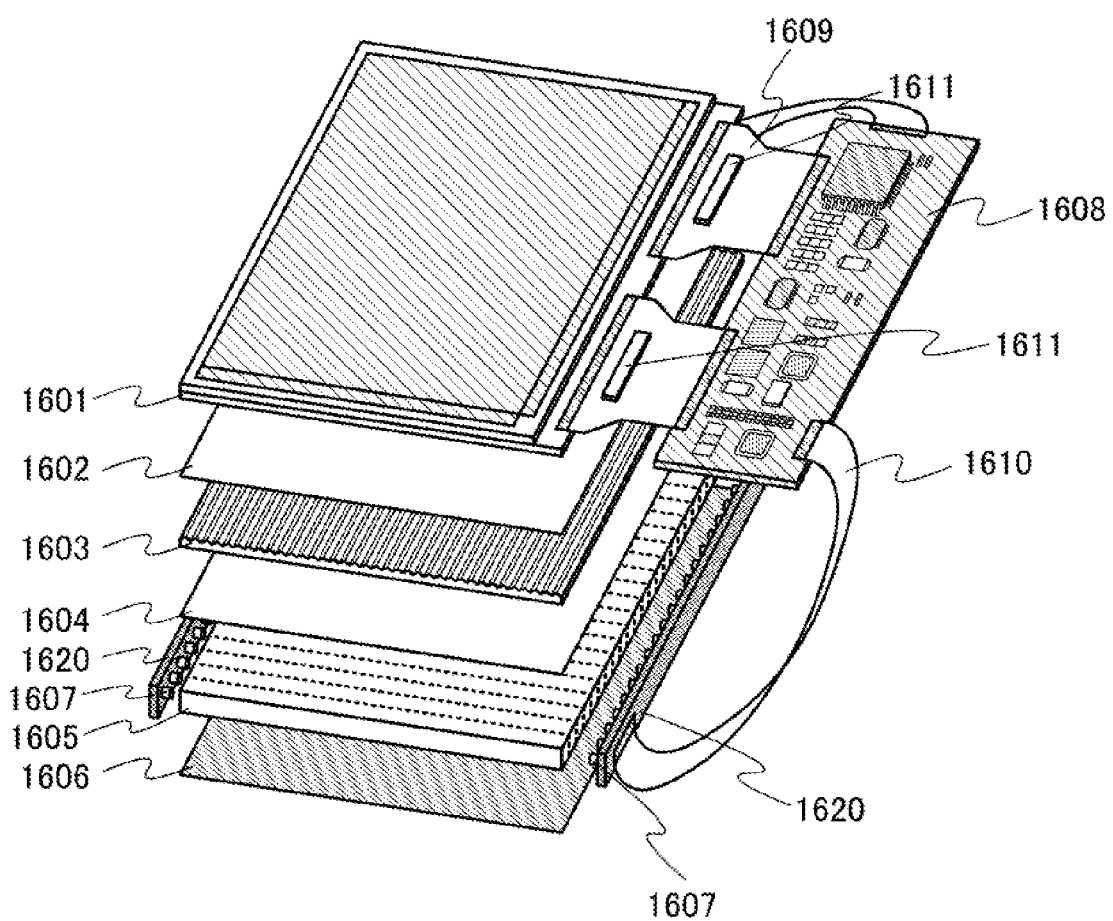
FIG. 12 is a perspective view of a liquid crystal display device.

FIG. 12 is an example of a perspective view illustrating a structure of a liquid crystal display device. The liquid crystal display device illustrated in FIG. 12 includes a panel 1601 in which a pixel portion is formed between a pair of substrates, a first diffuser plate 1602, a prism sheet 1603, a second diffuser plate 1604, a light guide plate 1605, a backlight 1620 including a plurality of light sources 1607, a reflective plate 1606, a circuit board 1608, and a substrate 1611 provided with a signal line driver circuit.

The panel 1601, the first diffuser plate 1602, the prism sheet 1603, the second diffuser plate 1604, the light guide plate 1605, and the reflective plate 1606 are sequentially stacked. The backlight 1620 is provided at an end portion of the light guide plate 1605. Light from the light sources 1607 that is diffused in the light guide plate 1605 is delivered to the panel 1601 through the first diffuser plate 1602, the prism sheet 1603, and the second diffuser plate 1604.

Although the first diffuser plate 1602 and the second diffuser plate 1604 are used in this embodiment, the number of diffuser plates is not limited to two. The number of diffuser plates may be one, or may be three or more. The diffuser plate may be provided between the light guide plate 1605 and the panel 1601. Therefore, the diffuser plate may be provided only on the side closer to the panel 1601 than the prism sheet 1603, or may be provided only on the side closer to the light guide plate 1605 than the prism sheet 1603.

The shape of the prism sheet 1603 is not limited to a sawtooth shape in section illustrated in FIG. 12, and may be a shape with which light from the light guide plate 1605 can be concentrated on the panel 1601 side.

The circuit board 1608 is provided with a circuit which generates various signals input to the panel 1601, a circuit which processes the signals, or the like. In FIG. 12, the circuit board 1608 and the panel 1601 are connected to each other with a COF tape 1609. Moreover, the substrate 1611 provided with the signal line driver circuit is connected to the COF tape 1609 by a chip on film (COF) method.

FIG. 12 illustrates an example in which the circuit board 1608 is provided with a control circuit which controls driving of the backlight 1620 and the control circuit and the backlight 1620 are connected to each other through an FPC 1610. Note that the control circuit may be formed over the panel 1601. In that case, the panel 1601 and the backlight 1620 are connected to each other through an FPC or the like.

In the example of FIG. 12, the edge-light type backlight 1620 provided at an end portion of the panel 1601 is used; however, the present invention is not limited to this structure. In one embodiment of the present invention, a direct-below type backlight provided directly below the panel 1601 may be used. Alternatively, in one embodiment of the present invention, a frontlight may be used.

This embodiment can be implemented in appropriate combination with any of the above embodiments.

Example 1

In a liquid crystal display device according to one embodiment of the present invention, the display area in a liquid crystal layer can be surely enlarged; thus, an improvement in contrast can be achieved. Further, in a liquid crystal display device according to one embodiment of the present invention, the following effects can be obtained: generation of flickers is suppressed due to a reduction in off-state current of a transistor and the driving frequency is increased due to a reduction in parasitic capacitance in a transistor. Therefore, an electronic device including the liquid crystal display device is capable of displaying high-quality images.

Figure 13A:
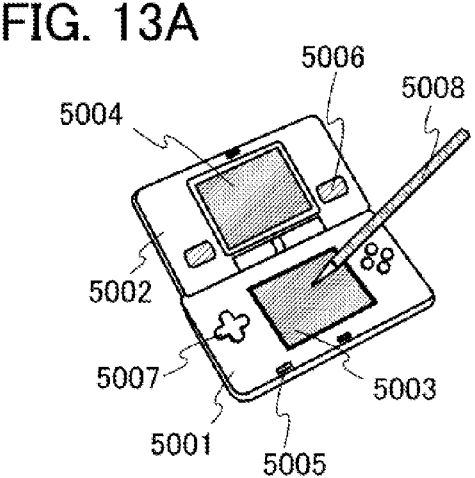
FIGS. 13A to 13C illustrate electronic devices.
Figure 13B:
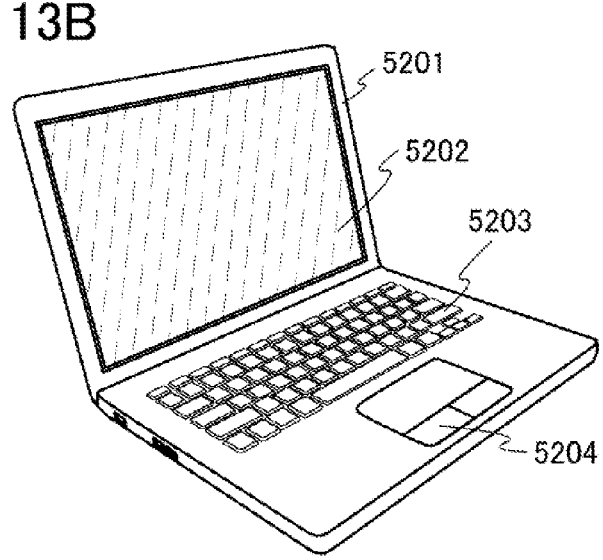
Figure 13C:
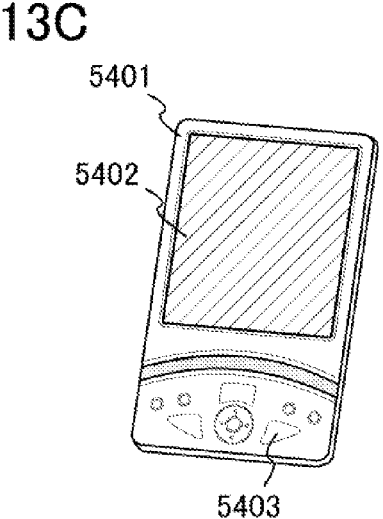

A liquid crystal display device according to one embodiment of the present invention can be used for display devices, laptop personal computers, or image reproducing devices provided with recording media (typically, devices which reproduce the content of recording media such as digital versatile discs (DVDs) and have displays for displaying the reproduced images). Other examples of electronic devices which can be provided with a liquid crystal display device according to one embodiment of the present invention include mobile phones, portable game machines, portable information terminals, electronic book readers, cameras such as video cameras and digital still cameras, goggle-type displays (head mounted displays), navigation systems, audio reproducing devices (e.g., car audio systems and digital audio players), copiers, facsimiles, printers, multi-function printers, automated teller machines (ATM), vending machines, and the like. FIGS. 13A to 13C illustrate specific examples of these electronic devices.

FIG. 13A illustrates a portable game machine including a housing 5001, a housing 5002, a display portion 5003, a display portion 5004, a microphone 5005, a speaker 5006, an operation key 5007, a stylus 5008, and the like. A liquid crystal display device according to one embodiment of the present invention can be used for the display portion 5003 or the display portion 5004. The use of a liquid crystal display device according to one embodiment of the present invention for the display portion 5003 or the display portion 5004 can provide a portable game machine capable of displaying high-quality images. Note that although the portable game machine illustrated in FIG. 13A includes the two display portions 5003 and 5004, the number of display portions included in the portable game machine is not limited to two.

FIG. 13B illustrates a laptop personal computer including a housing 5201, a display portion 5202, a keyboard 5203, a pointing device 5204, and the like. A liquid crystal display device according to one embodiment of the present invention can be used for the display portion 5202. The use of a liquid crystal display device according to one embodiment of the present invention for the display portion 5202 can provide a laptop personal computer capable of displaying high-quality images.

FIG. 13C illustrates a portable information terminal including a housing 5401, a display portion 5402, operation keys 5403, and the like. A liquid crystal display device according to one embodiment of the present invention can be used for the display portion 5402. The use of a liquid crystal display device according to one embodiment of the present invention for the display portion 5402 can provide a portable information terminal capable of displaying high-quality images.

As described above, the application range of the present invention is extremely wide and the present invention can be applied to electronic devices in a variety of fields.

This example can be implemented in appropriate combination with any of the above embodiments.

This application is based on Japanese Patent Application serial no. 2011-054001 filed with Japan Patent Office on Mar. 11, 2011, the entire contents of which are hereby incorporated by reference.

What is claimed is:

1. A manufacturing method of a liquid crystal display device, comprising the steps of:
    forming a first conductive layer over an insulating surface;
    forming a first insulating layer and a second insulating layer over the first conductive layer; and
    etching the first conductive layer with a first dry etching using the first insulating layer and the second insulating layer as masks, thereby a second conductive layer on a bottom surface and a side surface of the first insulating layer and a third conductive layer on a bottom surface and a side surface of the second insulating layer are formed,
    wherein, the second conductive layer remains on the bottom surface and the side surface of the first insulating layer in the liquid crystal display device, and
    wherein, the third conductive layer remains on the bottom surface and the side surface of the second insulating layer in the liquid crystal display device,
    wherein, in the etching step, at least one of a conductive material for forming the first conductive layer, and a reaction product of the conductive material and a gas used for the first dry etching, is deposited on the side surface of the first insulating layer and the side surface of the second insulating layer.

2. The manufacturing method of a liquid crystal display device according to claim 1, wherein at least one of the first conductive layer and the second conductive layer includes at least one of tungsten and tantalum nitride.

3. The manufacturing method of a liquid crystal display device according to claim 1, wherein the forming step of the first conductive layer comprises the steps of:
    forming a fourth conductive layer including aluminum; and
    forming a fifth conductive layer over the fourth conductive layer, the fifth conductive layer including at least one of tungsten and tantalum nitride.

4. The manufacturing method of a liquid crystal display device according to claim 1, wherein, in the etching step, a temperature of a substrate is higher than or equal to −20° C. and lower than or equal to 0° C.

5. The manufacturing method of a liquid crystal display device according to claim 1, wherein the forming step of the first insulating layer and the second insulating layer is performed by a second dry etching.

6. The manufacturing method of a liquid crystal display device according to claim 1, wherein a tapered angle formed between the side surface of the first insulating layer and a top surface of the first conductive layer is greater than or equal to 60° and less than or equal to 90°.

7. A manufacturing method of a liquid crystal display device, comprising the steps of:
    forming a first conductive layer over an insulating surface;

forming a first insulating layer and a second insulating layer over the first conductive layer; and etching the first conductive layer with a first dry etching using the first insulating layer and the second insulating layer as masks, thereby a second conductive layer on a bottom surface and a side surface of the first insulating layer and a third conductive layer on a bottom surface and a side surface of the second insulating layer are formed, wherein, the second conductive layer remains on the bottom surface and the side surface of the first insulating layer in the liquid crystal display device, and wherein, the third conductive layer remains on the bottom surface and the side surface of the second insulating layer in the liquid crystal display device, wherein, in the etching step, a conductive material for forming the first conductive layer, and a reaction product of the conductive material and a gas used for the first dry etching, are deposited on the side surface of the first insulating layer and the side surface of the second insulating layer.

8. The manufacturing method of a liquid crystal display device according to claim 7, wherein at least one of the first conductive layer and the second conductive layer includes at least one of tungsten and tantalum nitride.

9. The manufacturing method of a liquid crystal display device according to claim 7, wherein the forming step of the first conductive layer comprises the steps of:
   forming a fourth conductive layer including aluminum; and
   forming a fifth conductive layer over the fourth conductive layer, the fifth conductive layer including at least one of tungsten and tantalum nitride.

10. The manufacturing method of a liquid crystal display device according to claim 7, wherein, in the etching step, a temperature of a substrate is higher than or equal to −20° C. and lower than or equal to 0° C.

11. The manufacturing method of a liquid crystal display device according to claim 7, wherein the forming step of the first insulating layer and the second insulating layer is performed by a second dry etching.

12. The manufacturing method of a liquid crystal display device according to claim 7, wherein a tapered angle formed between the side surface of the first insulating layer and a top surface of the first conductive layer is greater than or equal to 60° and less than or equal to 90°.

* * * * *